United States Patent [19]

Katayama et al.

[11] Patent Number: 5,171,764
[45] Date of Patent: Dec. 15, 1992

[54] RESIN COMPOSITION FOR CATIONICALLY ELECTRODEPOSITABLE PAINT CONTAINING FINELY DIVIDED GELLED POLYMER BASED ON RADICALLY POLYMERIZABLE HYDROLYZABLE SILANE MONOMERS

[75] Inventors: Teiji Katayama; Eisaku Nakatani; Haruo Nagaoka; Kenji Yamamoto, all of Hiratsuka; Reiziro Nishida, Chigasaki, all of Japan

[73] Assignee: Kansai Paint Co., Ltd., Hyogo, Japan

[21] Appl. No.: 656,828

[22] Filed: Feb. 19, 1991

[30] Foreign Application Priority Data

Feb. 16, 1990 [JP] Japan ................. 2-33971

[51] Int. Cl.$^5$ ............... C09D 5/44; C25D 13/06
[52] U.S. Cl. ..................... 523/201; 523/404; 523/415; 525/902; 428/413
[58] Field of Search ............ 523/201, 404, 415; 525/902; 428/413

[56] References Cited

U.S. PATENT DOCUMENTS

| 4,579,889 | 4/1986 | Kaffen et al. ............ 523/414 |
| 4,987,178 | 1/1991 | Shibata et al. ........... 524/547 |
| 5,021,530 | 6/1991 | Yamamoto et al. ......... 526/323.2 |

FOREIGN PATENT DOCUMENTS 0197411  3/1986  European Pat. Off. .
0282000  3/1988  European Pat. Off. .

OTHER PUBLICATIONS

Database WPI, No. 77-69-659, Derwent Publications Ltd., London, England (abstracting JP-A 52 098 028).

Primary Examiner—Melvyn I. Marquis
Assistant Examiner—Frederick Krass
Attorney, Agent, or Firm—Wenderoth, Lind & Ponack

[57] ABSTRACT

A resin composition for cationically electrodepositable paint comprising, as principal components, (A) a resin containing a hydroxyl group and a cationic group, (B) an epoxy resin containing, per molecule, on the average at least 2 epoxy group-containing functional groups with an epoxy group bound to an alicyclic skeleton and/or a bridged alicyclic skeleton, and (C) a finely divided gelled polymer, said finely divided gelled polymer (C) being obtained by, in the first step, emulsion polymerizing (I) a monomer component composed of (a) a polymerizable unsaturated vinylsilane monomer containing a vinylic double bond and a hydrolyzable alkoxysilane group,
(b) a polymerizable monomer containing at least two radically polymerizable unsaturated groups in a molecule,
(c) a polymerizable unsaturated monomer containing a vinylic double bond and a hydroxyl group, and
(d) the other polymerizable unsaturated monomer using a cationic reactive emulsifying agent containing an allyl group in a molecule; and in the second step, emulsion polymerizing (II) a monomer component composed of
(e) a blocked monoisocyanate or polyisocyanate in which at least one isocyanate group in a molecule is blocked with a radically polymerizable monohydroxy compound,
(f) a polymerizable unsaturated monomer containing a vinylic double bond and a hydroxyl group, and
(g) the other polymerizable unsaturated monomer in the presence of the aqueous finely divided gelled polymer obtained in the first step, said polymer having a core-sheath structure in which the polymerized product of the monomer component (I) is a core and the polymerized product of the monomer component (II) is a sheath (shell).

40 Claims, No Drawings

RESIN COMPOSITION FOR CATIONICALLY ELECTRODEPOSITABLE PAINT CONTAINING FINELY DIVIDED GELLED POLYMER BASED ON RADICALLY POLYMERIZABLE HYDROLYZABLE SILANE MONOMERS

This invention relates to a novel cationically electrodepositable paint. More specifically, this invention relates to a resin composition for cationically electrodepositable paint excellent in bath stability and curability as well as in adhesion, weatherability, corrosion resistance and low-temperature curability of a coated film, and having improved edge coverability of an edge of a coated product, said composition being formed without the use of a blocked isocyanate as a curing agent or an organotin compound as a curing catalyst.

As a conventional resin composition for a cationically electrodepositable paint, a resin composition comprising an aromatic polyisocyanate compound blocked by alcohols (curing agent) and a polyamine resin such as an amine-added epoxy resin as a primary component is most widely used, which earned an excellent assessment with reference to corrosion resistance of the paint film. However, this resin composition essentially has defects, the following points, first of all, curing initiating temperature is high (at least 170° C.), and to lower this curing initiating temperature, when an organotin compound is used as a curing catalyst, said tin compound sometimes poisons an exhaust combustion catalyst of the baking furnace; further, to cure the paint film, when the film is heated at a high temperature, the blocked polyisocyanate thermally decomposes to produce gum and soot, in addition, brings about yellowing, bleeding and curing impediment of the top coat film, and at the same time, said top coat film remarkably lowers in weatherability and tends to be whitened, that are serious drawbacks. Therefore, the improvement thereof is strongly desired.

Accordingly, the applicant or assignee's company made assiduous investigations to provide a resin composition for a cationically electrodepositable paint having an excellent merit of such an isocyanate curing type without using a blocked isocyanate compound and an organotin compound, which has solved the aforesaid defects provided by the use of these compounds, and proposed before a resin composition for a cationically electrodepositable paint comprising a resin (A) having hydroxyl groups and cationic groups, and an epoxy resin (B) having at least 2 epoxy functional groups each of which comprises an epoxy group directly bound to an alicyclic ring and/or bridged alicyclic ring on average per molecule, as principal components (see EP-A-0 356 970 and U.S. patent application Ser. No. 07/401,138).

Said composition possesses such various excellent advantages that it can be cured at a low temperature of less than 160° C. without the use of a tin catalyst; since a blocked isocyanate compound or its derivatives are not used, the above various defects given by using them can be remedied; good adhesion is exhibited without volume shrinkage owing to thermal decomposition; because an aromatic urethane bond or an aromatic urea bond is not introduced in crosslinking, weatherability is less impaired; curability and corrosion resistance of an electrodeposition coated film are excellent; and stability of a electrodeposition coating bath is good.

The present inventors have however made further studies and consequently found that as the above composition is not sufficient in edge coverability, corrosion resistance of the edge has to be more improved.

The present inventors have therefore conducted extensive studies to improve edge coverability without impairing the advantages of the composition and as a result, discovered that the very object can be achieved by blending the composition with a specific finely divided gelled polymer. This discovery has led to completion of this invention.

Thus, according to this invention, there is provided a resin composition for cationically electrodepositable paint comprising, as principal components, (A) a resin containing a hydroxyl group and a cationic group, (B) an epoxy resin containing, per molecule, on the average at least 2 epoxy group-containing functional groups with an epoxy group bound to an alicyclic skeleton and/or a bridged alicyclic skeleton, and (C) a finely divided gelled polymer, said finely divided gelled polymer (C) being obtained by, in the first step, emulsion polymerizing (I) a monomer component composed of (a) a polymerizable unsaturated vinylsilane monomer containing a vinylic double bond and a hydrolyzable alkoxysilane group,
(b) a polymerizable monomer containing at least two radically polymerizable unsaturated groups in a molecule,
(c) a polymerizable unsaturated monomer containing a vinylic double bond and a hydroxyl group, and
(d) the other polymerizable unsaturated monomer using a cationically reactive emulsifying agent containing an allyl group in a molecule; and in the second step, emulsion polymerizing (II) a monomer component composed of
(e) a blocked monoisocyanate or polyisocyanate in which at least one isocyanate group in a molecule is blocked with a radically polymerizable monohydroxy compound,
(f) a polymerizable unsaturated monomer containing a vinylic double bond and a hydroxyl group, and
(g) the other polymerizable unsaturated monomer in the presence of the aqueous finely divided gelled polymer obtained in the first step, said polymer having a core-sheath structure in which the polymerized product of the monomer component (I) is a core and the polymerized product of the monomer component (II) is a sheath (shell).

The resin composition for cationically electrodepositable paint (hereinafter abbreviated at times as "this composition") in the present invention has improved edge coverability without impairing the aforesaid advantages of the composition composed principally of the components (A) and (B).

Especially, it has been found that the cationically electrodepositable finely divided gelled polymer [component (C)] resulting from emulsion polymerization using the cationically reactive emulsifying agent and having a core-sheath structure composed of a core component containing a hydrolyzable alkoxysilane group and a hydroxyl group and a sheath component containing a urethane bond and a hydroxyl group is cationically electrodepositable and does not impair bath stability and electrodeposition characteristics even if added to a cationically electrodepositable paint; and that in baking, the urethane bond in the sheath component is condensed with the hydroxyl group to conduct crosslinking between particles and crosslinking between the components (A) and (B), and at the same time, the silanol group of the core component partially participates in the crosslinking reaction, effectively improving prevention of cissing, edge coverability, adhesion and chipping resistance of the coated film without impairing water resistance, corrosion resistance and surface smoothness of the coated film, and edge coverability does not decrease with time.

The electrodeposition coated film formed by using this composition can be cured at a temperature of about 250° C. or lower. In particular, if a compound containing a metal such as lead, zirconium, cobalt, aluminum, manganese, copper, zinc, iron, chromium or nickel is blended as a catalyst either singly or in combination, the film can be cured by heating at a low temperature of about 70° C. to about 160° C. Presumably, the curing is chiefly conducted such that the epoxy group contained in the epoxy resin (B) is ring-opened and reacted with the hydroxyl group (preferably a primary hydroxyl group) of the resin (A) and further the epoxy groups of the resin (B) are reacted with each other to form ether linkages respectively and effect crosslinking and curing. The finely divided polymer (C) is supposed to participate in crosslinking and curing as stated above.

Finely divided gelled polymers have been blended so far to improve spray efficiency of a paint, sag prevention of a coated film and pattern control of a metallic pigment. However, whether these polymers are nonaqueous or aqueous dispersions, they are dispersions obtained by emulsion polymerization using a non-reactive surface active agent and decrease water resistance, solvent resistance and chemical resistance of the coated film. By contrast, it has been found that the component (C) used in this composition is a specific finely divided gelled polymer of a internal crosslinking type wherein a group having surface activity is incorporated into surfaces of resin particles by chemical bonding, contributing equally to improvement in edge coverability, edge corrosion resistance and adhesion without having adverse effect on properties of the coated film, such as water resistance, solvent resistance and chemical resistance.

The principal components (A), (B) and (C) of this composition will be explained in more detail below.

Component (A)

The resin (A) having hydroxyl groups and cationic groups used in the composition of this invention is optionally a resin containing hydroxyl groups, preferably primary hydroxyl groups reactive with the epoxy group of the component (B) and a sufficient number of cationic groups for forming a stable aqueous dispersion. Examples of said resin (A) are as follows.

(i) A reaction product obtained by reacting a polyepoxy resin with a cationizing agent;
(ii) A polycondensation product of a polycarboxylic acid and polyamine (see U.S. Pat. No. 2,450,940) protonated with an acid;
(iii) A polyaddition product of polyisocyanate and polyol and mono- or poly-amine protonated with an acid;
(iv) A copolymer of an acryl or vinyl monomer containing a hydroxyl group and one containing amino group protonated with an acid (see Japanese Patent Publications Nos. 12395/1970 and 12396/1970;
(v) An adduct of a polycarboxylic acid resin and an alkylene imine protonated with an acid (see U.S. Pat. No. 3,403,088); etc.

Since the specific examples of these cationic resins and the processes for their production are described in, for example, Japanese Patent Publications Nos. 12395/1970 and 12396/1970, and GB 1327071 as well as U.S. Pat. Nos. 2,450,940, 3,403,088, 3,891,529 and 3,963,663, detailed description of the specific examples of these cationic resins and the processes for their production is replaced by quotation of these references in this specification.

What is especially desirable as the resin (A) in the present invention is a reaction product obtained by reacting a polyepoxide compound obtained from a polyphenol compound and epichlorohydrin with a cationizing agent included in (i) above.

Said polyepoxide compound is a compound having at least 2 epoxy groups

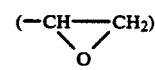

in one molecule, and having a number average molecular weight within the range of generally at least 200, preferably 400 to 4,000, more preferably 800 to 2,000. As such polyepoxide compound, what is known per se may be used, for example, polyglycidyl ether of a polyphenol compound which may be produced by reacting a polyphenol compound with epichlorohydrin in the presence of an alkali, is included.

As the polyphenol compound which may be used in the above reaction, there may be cited, for example,
bis(4-hydroxyphenyl)-2,2-propane,
4,4'-dihydroxybenzophenone,
bis(4-hydroxyphenyl)-1,1-ethane,
bis(4-hydroxyphenyl)-1,1-isobutane,
bis(4-hydroxy-tert-butyl-phenyl)-2,2-propane,
bis(2-hydroxynaphthyl)methane, 1,5-dihydroxynaphthalene,
bis(2,4-dihydroxyphenyl)methane,
tetra(4-hydroxyphenyl)-1,1,2,2-ethane,
4,4'-dihydroxydiphenylether,
4,4'-dihydroxydiphenylsulfone, phenol novolak and cresol novolak.

Of the aforesaid polyepoxide compounds, what is especially preferable for the production of the resin (A), is diglycidylether of a polyphenol compound having a number average molecular weight of at least about 380, more preferably about 800 to about 2,000 and an epoxy equivalent of 190 to 2,000, preferably 400 to 1,000, especially what is represented by the following formula:

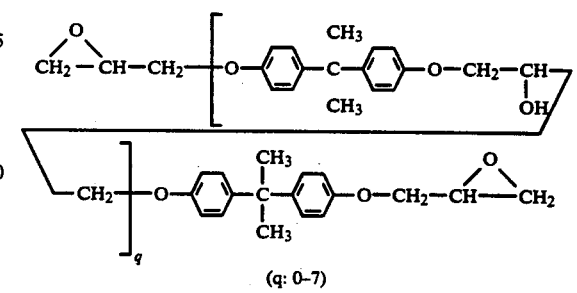

(q: 0-7)

Said polyepoxide compound may be partly reacted with polyol, polyether polyol, polyester polyol, polyamide amine, a polycarboxylic acid and polyisocyanate, and further, it may be graft polymerized with ε-caprolactone or an acrylic monomer, etc.

On the other hand, as a cationizing agent for introducing a cationic group to said polyepoxide compound, there may be cited an aliphatic, alicyclic or aromatic-aliphatic primary or secondary amine, tertiary amine salt, secondary sulfide salt and tertiary phosphine salt. These react with an epoxy group to produce a cationic group. It is further possible to introduce a cationic group by reacting a tertiary amino monoisocyanate obtained from a tertiary aminoalcohol and a diisocyanate, with a hydroxyl group of the epoxy resin.

As examples of the amine compound in said cationizing agent, for example, the following amines may be exemplified.

(1) Primary amines such as methyl amine, ethyl amine, n- or iso-propyl amine, monoethanol amine and n- or iso-propanol amine;

(2) Secondary amines such as diethyl amine, diethanol amine, di-n- or iso-propanol amine, N-methylethanol amine and N-ethylethanolamine; and (3) Polyamines such as ethylene diamine, diethylene triamine, hydroxyethylaminoethyl amine, ethylaminoethyl amine, methylaminopropyl amine, dimethylaminoethyl amine and dimethylaminopropyl amine.

Of these amines, alkanol amines having hydroxyl groups are preferable. Also, a primary amino group of polyamines may be reacted with ketone in advance to block said group, and then the remaining active hydrogen may be reacted with an epoxy group.

Further, besides said amine compounds, a basic compound such as ammonia, hydroxyl amine, hydrazine, hydroxyethyl hydrazine and a N-hydroxyethyl imidazoline compound may be used similarly. Basic groups formed by using these compounds may be protonated with an acid, especially preferably a water-soluble organic carboxylic acid such as formic acid, acetic acid, glycolic acid and lactic acid to be made into cationic groups.

Furthermore, tertiary amines such as triethyl amine, triethanol amine, N,N-dimethylethanol amine, N-methyldiethanol amine, N,N-diethylethanol amine and N-ethyldiethanol amine may be used, protonated with an acid in advance, and then reacted with an epoxy group to be made into quaternary salts.

Besides the salts of amines, salts of sulfides such as diethyl sulfide, diphenyl sulfide, tetramethylene sulfide or thiodiethanol and boric acid, carbonic acid or an organic monocarboxylic acid may be reacted with an epoxy group to make them tertiary sulfonium salts.

In addition, salts of phosphines such as triethyl phosphine, phenyldimethyl phosphine, diphenylmethyl phosphine or triphenyl phosphine and such acids as mentioned above may be reacted with an epoxy group to make them quaternary phosphonium salts.

As hydroxyl groups of the resin (A) used in the present invention, there may be cited, for example, primary hydroxyl groups which can be introduced from alkanol amines as said cationizing agent, ring opened caprolactone that may be introduced into an epoxide compound, and polyols; and secondary hydroxyl groups of epoxide resin. Of these, primary hydroxyl groups by alkanol amines are preferable because of being excellent in crosslinking reactivity with the epoxy resin (B). As such alkanol amines, what is exemplified in said cationizing agent is preferable.

The content of hydroxyl groups in the resin (A) is, from the point of view of the crosslinking reactivity with the epoxy group contained in the epoxy resin (B), preferably, calculated as a hydroxyl group equivalent, within the range of 20 to 5,000, especially 100 to 1,000. Especially, the primary hydroxyl group equivalent is preferably within the range of 200 to 1,000. The content of cationic groups is preferably in excess of the lower limit necessary for stably dispersing said resin (A), and generally it is preferably within the range of 3 to 200, especially from 10 to 80 calculated as amine value KOH mg/g of the solids. However, even if the cationic group content is less than 3, it is possible to use it after making it an aqueous dispersion by the use of a surface active agent; in this case, however, it is desirable to adjust the cationic group so as to make the pH of the aqueous dispersed composition, usually 4 to 9, more preferably 6 to 7.

The resin (A) used in the present invention has hydroxyl groups and cationic groups and is desirably free from free epoxy groups as a rule.

Component (B)

The epoxy resin (B) is a curing agent for forming a crosslinked paint film mainly by an etherification reaction with the resin (A) as mentioned above, which contains at least 2, preferably at least 3, specified "epoxy functional groups" on average in one molecule.

Namely, said epoxy functional group in the epoxy resin (B) comprises an epoxy group directly bonded to an alicyclic ring and/or bridged alicyclic ring in which said alicyclic ring is a 4–10 member, preferably 5–6 member saturated carbon monocyclic or polycyclic ring, while said bridged alicyclic ring contains bridges (endmethylene, endethylene, etc.) of a straight chain (linear) or branched $C_{1-6}$ (preferably $C_{1-4}$) alkylene group (for example, $-CH_2-$, $-CH_2CH_2-$, $-CH(CH_3)-$, $-CH_2(CH_3)CH_2-$, $-C(CH_3)_2-$, $-CH(C_2H_5)CH_2-$, etc.) between 2 carbon atoms constituting said monocyclic or polycyclic ring.

On the other hand, an epoxy group

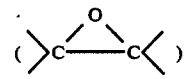

is important in that one of the carbon atoms in said epoxy group is directly bonded to the cyclic carbon atom (or atoms) of said alicyclic ring or said bridged alicyclic ring [see, for example, the following formulae (I) and (II)], or the two carbon atoms of said epoxy group are common with the two adjoining carbon atoms constituting the ring in said alicyclic ring or said bridged alicyclic ring [see, for example, the following formulae (III) and (IV)].

As the specific examples of such epoxy functional group, what is represented by the following formulae (I) to (IV) may be cited.

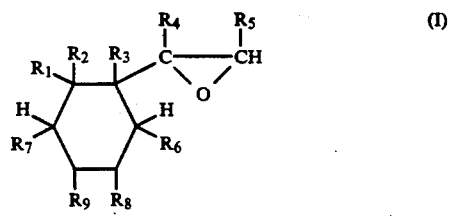
(I)

-continued

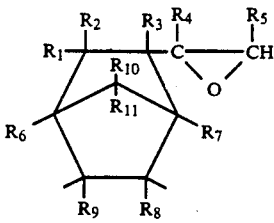

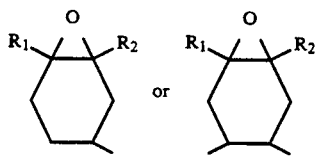

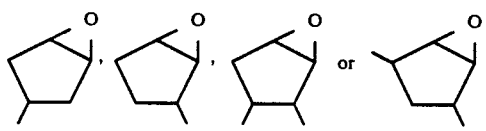

wherein
$R_1$, $R_2$, $R_3$, $R_5$, $R_6$, $R_7$, $R_{10}$ and $R_{11}$ represent H, $CH_3$ or $C_2H_5$, respectively, and $R_4$, $R_8$ and $R_9$ represent H or $CH_3$, respectively.

The epoxy resin (B) used in the present invention may have at least 2, preferably at least 3, more preferably at least 4, epoxy functional groups selected from said formulae (I) to (IV) on average in one molecule. For example, the epoxy resin (B) may have at least one kind of the epoxy functional group represented by said formula (I) or (II), or may have at least one kind of the epoxy functional group represented by said formula (III) or (IV) in one molecule. Furthermore, the epoxy resin (B) may have at least one kind of the epoxy functional group represented by said formula (I) or (II) and at least one kind of the epoxy functional group represented by said formula (III) or (IV) within one and the same molecule or in different molecules.

Of the above, the epoxy functional group represented by said formula (I) or (III) is preferable, and especially, an epoxy functional group represented by the following formula (V)

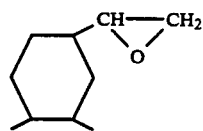

an an epoxy functional group represented by the following formula (VI) are preferable.

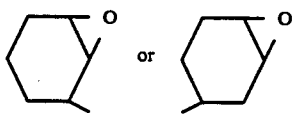

Additionally, the epoxy equivalent and the molecular weight of the epoxy resin (B) used in the present invention are not strictly restricted, but are changeable according to a process for the production thereof and the use of the end resin composition. But, generally speaking, the epoxy equivalent may be within the range of usually 100 to 2,000, preferably 150 to 500, more preferably 150 to 250.

And it is proper that the number average molecular weight is within the range of usually 400 to 100,000, preferably 700 to 50,000, more preferably 700 to 30,000.

The epoxy resin (B) having at least 2 such epoxy functional groups in one molecule is described in literatures such as, for example, Japanese Patent Publication No. 8016/1981 as well as Japanese Laid-Open Patent Publications Nos. 47365/1982, 166675/1985, 221121/1968 and 234028/1988, and what is known per se may be used.

Or said epoxy resin (B) having said epoxy functional groups is obtained by processes known per se. The main processes for producing said epoxy resin (B) will be enumerated hereinbelow, but the enumerated processes are not limitative.

A first process for the production:

A process for producing an epoxy resin having at least 2 epoxy functional groups in one molecule which comprises epoxidating part of carbon-carbon double bonds of an alicyclic compound having said at least 2 carbon-carbon double bonds in one molecule, subjecting the resulting epoxy groups to a ring-opening polymerization, and thereafter epoxidating said double bonds remaining in the resulting polymer.

A second process for the production:

A process for subjecting an alicyclic compound having at least 2 epoxy groups in the same molecule to ring-opening polymerization to such an extent as may not eliminate all of said epoxy groups on the basis of said epoxy groups.

A third process for the production:

A process for polymerizing a compound having an epoxy functional group and a polymerizable unsaturated bond in the same molecule.

A more specific explanation will be made with reference to these processes for the production hereinbelow.

The First Process for the Production

This process comprises epoxidating part of carbon-carbon double bonds (a partial epoxidation product) contained in an alicyclic compound having at least 2 carbon-carbon double bonds in one molecule [hereinafter referred to as "the alicyclic compound (X)"], obtaining a ring-opened polymer of said partial epoxidation product by ring-opening polymerization of the resulting epoxy groups, and thereafter epoxidating part or whole of said double bonds remaining in said polymer to thereby obtain an epoxy resin (B).

The alicyclic compound (X) is a compound having a structure of an alicyclic ring or a bridged alicyclic ring mentioned above and at least 2 carbon-carbon double bonds, existing between 2 adjoining carbon atoms constituting the ring structure or between the other carbon atoms being directly bonded to said ring structure.

The alicyclic compound (X) may also be obtained by heating, for example, a conjugated diene compound by a known method. As such conjugated diene compound, an aliphatic or alicyclic compound having 4 to 30 carbon atoms and having at least 1 pair, preferably 1 to 5 pairs of conjugated double bonds in one molecule is suitable.

Specific examples of such conjugated diene compound include butadiene, isoprene, pirylene, 1,3-hexadiene, 2,4-hexadiene, 2,4-heptadiene, 2-methyl-6-methylene-2,7-octadiene, 2,6-dimethyl-1,5,7-octatriene, cyclopentadiene, cyclohexadiene, 4-ethyl-2-methylcyclopentadiene, 3-isopropyl-1-methylcyclopentadiene, 5-isopropylcyclopentadiene, 1,2,3,4-tetraphenylcyclopentadiene, 1,2,4-triphenylcyclopentadiene, 1,4-diphenylcyclopentadiene, 1,3-octachloropentadiene, hexachlorocyclopentadiene, 5,5-diethoxy-1,2,3,4-tetrachlorocyclopentadiene, 1,2,3,4,5-pentachlorocyclopentadiene, 1,2,3,4-tetrachlorocyclopentadiene, 1,3-cycloheptadiene, 1,3-cyclooctadiene, 1,3,5-cyclooctatriene, 1,3,6-cyclooctatriene, cyclooctatetraene, chlorocyclooctatetraene, bromocyclooctatetraene and 5-cyclohexylidenecyclopentadiene. These conjugated diene compounds may be used singly or in combination, respectively.

As required, when a conjugated diene compound under heating is reacted in the presence of a Ziegler catalyst, the alicyclic compound (X) is obtained. This reaction under heating may be carried out by a method known per se, for example, by a method disclosed in Japanese Laid-Open Patent Publication No. 102643/1974.

Typical examples of the so obtained alicyclic compound (X) are as follows.

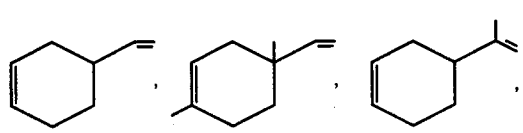

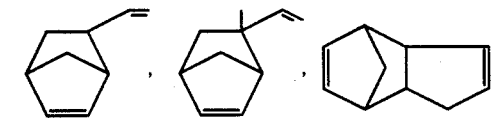

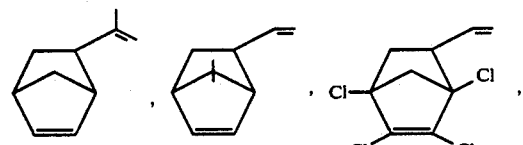

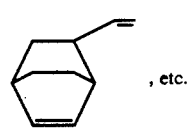, etc.

Of the aforesaid conjugated diene compounds, alicyclic compounds such as cyclopentadiene, cyclohexadiene and 4-ethyl-2-methylcyclopentadiene; and such compounds as sylvestrene, 2,8(9)-p-menthadiene, pyronene, 1,3-dimethyl-1-ethyl-3,5-cyclohexadiene, terpinene, phellandrene, dipentene, iso-limonene and limonene have already structures of the alicyclic compound (X); therefore, these compounds may be used per se without being subjected to said reaction under heating.

At first, part of (at least 2) carbon-carbon double bonds contained in the alicyclic compound (X) is modified to epoxy groups with a peroxide and so forth (partial epoxidation). The partial epoxidation product is obtained by modifying part of a plurality of double bonds contained in said alicyclic compound (X) to epoxy groups. Specific examples of such partial epoxidation product are as follows.

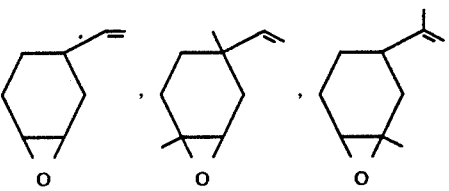

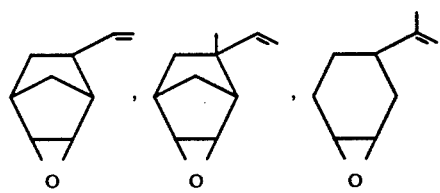

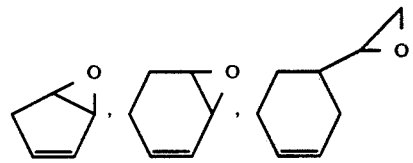

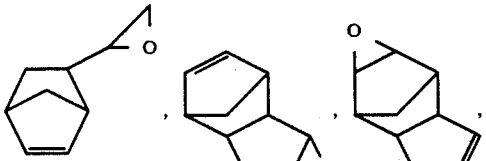

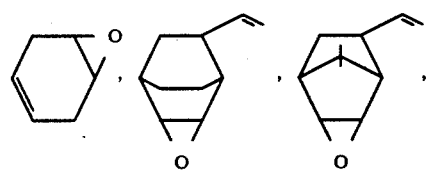

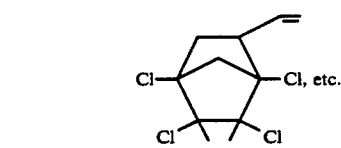

Naturally available epoxy carene may also be used as a partial epoxidation product.

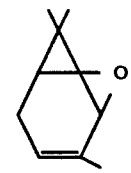

A partial epoxidation product has at least 1 epoxy group and at least 1 carbon-carbon double bond in one molecule, and said double bond is required to exist between 2 adjoining carbon atoms constituting the ring or between the other carbon atoms directly bonded to said ring.

Next, based on epoxy groups in this partial epoxidation product, ring-opening polymerization is carried out to obtain a polymer of the alicyclic compound (X). It is preferable to use a polymerization initiator for this ring-opening polymerization, and the terminal of the end product of the epoxy resin (B), a residue X by the initiator component(s) may be bonded, where X is a residue of an organic compound having active hydrogen. As an organic compound having active hydrogen which is a precursor of X, there may be cited, for example, alcohols, phenols, carboxylic acids, amines and thiols. Of these, as the alcohols, either one or monohydric alcohols or di- or higher polyhydric alcohls will do. Specific examples of the alcohols include aliphatic monohydric alcohols such as methanol, ethanol, propanol, butanol, pentanol, hexanol and octanol; an aromatic monohydric alcohol such as benzyl alcohol; and polyhydric alcohols such as ethylene glycol, diethylene glycol, triethylene glycol, polyethylene glycol, propylene glycol, dipropylene glycol, 1,3-butanediol, 1,4-butanediol, pentanediol, 1,6-hexanediol, neopentyl glycol, hydroxypivalic acid neopentyl glycol ester, cyclohexane dimethanol, glycerin, diglicerin, polyglycerin, trimethylol propane, trimethylol ethane, pentaerythritol and dipentaerythritol.

Specific examples of the phenols include phenol, cresol, catechol, pyrogallol, hydroquinone, hydroquinone monomethylether, bisphenol A, bisphenol F, 4,4'-dihydroxybenzophenone, bisphenol S, phenol resin and cresol novolak resin.

As the carboxylic acids, there may be illustrated formic acid, acetic acid, propionic acid, butyric acid, fatty acid of animal and vegetable oils; fumaric acid, maleic acid, adipic cid, dodecanoic diacid, trimellitic acid, pyromellitic acid, polyacrylic acid, phthalic acid, isophthalic acid and terephthalic acid, and further, a compound having both hydroxyl group and a carboxylic acid such as lactic acid, citric acid and hydroxycaproic acid may be used as well.

Besides, as the other compound having active hydrogen, a mixture of water and alkoxysilane such as tetramethyl silicate, tetraethyl silicate, methyltrimethoxysilane, methyltriethoxysilane, dimethyl dimethoxysilane and phenyl trimethoxysilane or silanol compounds of these; polyvinyl alcohol, a polyvinyl acetate partial hydrolyzed product, starch, cellulose, cellulose acetate, cellulose acetate butyrate, hydroxyethyl cellulose, acrylpolyol resin, styrene-allyl alcohol copolymer resin, styrene-maleic acid copolymer resin, alkyd resin, polyesterpolyol resin and polycaprolactonepolyol resin may be also used. Such compound may have an unsaturated double bond together with active hydrogen; further, said unsaturated double bond may be epoxidated. And a catalyst and a polymerization initiator may be the same like an alkoxy metal compound. Usually, the aforesaid organic compound having active hydrogen is used as a polymerization initiator, while the aforesaid partial epoxidation product such as, for example, 4-vinylcyclohexene-1-oxide, 4-vinylcyclo[2,2,1]-3-methyl-4(or 5)-t-propenyl-1-cyclohexene oxide, 2,4- or 1,4-dimethyl-4-ethenyl-1 -cyclohexene oxide, 4-vinylcyclo[2,2,1]-heptene-1-oxide (vinylnorbornene oxide) and 2-methyl-4-isopropanyl-cyclohexene oxide are used singly or in combination upon carrying out ring-opening polymerization. At this time, it is also possible to carry out ring-opening polymerization in the co-presence of the other epoxy compound but belonging to said partial epoxidation product. As the other copolymerizable epoxy compound, any compound will do so long as it has an epoxy group, but suitable examples of such other copolymerizable epoxy compound include an oxide of an unsaturated compound such as ethylene oxide, propylene oxide, butylene oxide and styrene oxide; a glycidyl ether compound such as allylglycidyl ether, 2-ethylhexylglycidyl ether, methylglycidyl ether, butylglycidyl ether and phenylglycidyl ether; an unsaturated organic carboxylic acid glycidyl ester compound such as acrylic acid and methacrylic acid; and an alicyclic oxiran group-containing vinyl monomer such as 3,4-epoxycyclohexyl methyl (meth)acrylate.

The aforesaid ring-opened polymer is obtained by ring-opening polymerizing epoxy groups contained in a partial epoxidation product alone or as required in the other epoxy compound made to be co-present with said partial epoxidation product to form an ether bond. The proportion of the other epoxy compound in a ring-opened polymer may be optionally selected in accordance with the object, but specifically, it is desirable to select said epoxy compound within such a range of proportion that said compound may have at least 2, preferably at least 3, more preferably at least 4, of one or more kinds of said structural formulae (I) to (IV) on average per molecule of the resulting ring-opened polymer. It is preferable that the number average molecular weight of the so obtained (co)polymer is within the range of usually from 400 to 100,000, especially from 700 to 50,000, more especially 700 to 30,000.

It is generally preferable to carry out ring-opening polymerization reaction in the presence of a catalyst.

Specific examples of the catalyst that can be used include amines such as methyl amine, ethyl amine, propyl amine and piperazine; organic bases such as pyridines and imidazoles; organic acids such as formic acid, acetic acid and propionic acid; inorganic acids such as sulfuric acid and hydrochloric acid; alkali metal alcoholates such as sodium methylate; alkalis such as KOH and NaOH: Lewis acid or its complexes such as $BF_3$, $ZnCl_2$, $AlCl_3$ and $SnCl_4$; and organometallic compounds such as triethyl aluminum, aluminum acetyl acetonate, titanium acetyl acetonate and diethyl zinc.

These catalysts may be used in amounts within the range of generally 0.001 to 10 % by weight, preferably 0.1 to 5 % by weight based on the reactant. The ring-opening polymerization temperature is within the range of generally about $-70°$ to about $200°$ C., preferably about $-30°$ to about $100°$ C. The reaction may be carried out in the presence of a solvent, and it is preferable to use an ordinary organic solvent not having active hydrogen as a solvent.

In the ring-opened polymer, there are double bonds derived from the alicyclic compound (X), and the epoxy resin (B) is obtained by epoxidizing part or whole of said double bonds. Epoxidation of the double bonds may be carried out by using an epoxidation agent such as, for example, peroxy acids and hydroperoxides. Whether a solvent should be used or not, the reaction temperature in the epoxidation reaction may be properly adjusted according to the apparatus used and the physical properties of the starting material. Depending on the conditions of the epoxidation reaction, simultaneous with epoxidation of the double bonds in the ring-opened polymer as a starting material, a side reaction occurs and the modified substituent may be contained in the skeleton of the epoxy resin (B) sometimes. As such modified substituent, when, for example, peracetic acid is used as the epoxidation agent, a substituent of the following structure may be cited, which is considered to be attributable to reaction of the produced epoxy group with the by-produt acetic acid.

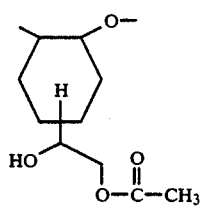

The ratio at which these substituents are contained in said skeleton is determined according to the kind of the epoxidation agent, the molar ratio of the epoxidation agent to the unsaturated bond and the reaction conditions.

The epoxy equivalent of the so obtained epoxy resin (B) is preferably within the range of generally 100 to 2,000, especially 150 to 500, more especially 150 to 250.

As such epoxy resin (B), what is commercially available may also be used, and as such merchandise, for example, EHPE-3150, EHPE-3100 and EHPE-1150 (trade names of products of Daicel Chemical Industries, Ltd.) may be cited. These are epoxy resins of the following structural formula having cyclohexene skeletons using 4-vinylcyclohexene-1-oxide as a partial epoxidation product for their production.

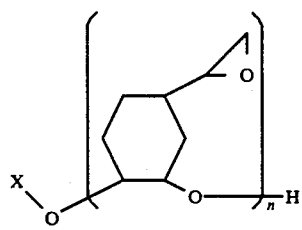

wherein n is at least 2, preferably at least 3, more preferably at least 4.

The Second Process for the Production

According to this process, the objective epoxy resin is obtained by, for example, epoxidizing at least 2 of the double bonds contained in said alicyclic compound (X) to form an alicyclic compound having at least 2 epoxy groups in the same molecule [hereinafter referred to as "The alicyclic compound (Y)"], and thereafter subjecting the alicyclic compound (Y) to ring-opening polymerization in such a manner as to retain the resulting epoxy groups.

As the alicyclic compound (Y), the following monocyclic or condensed ring-type compounds may be shown as typical examples.

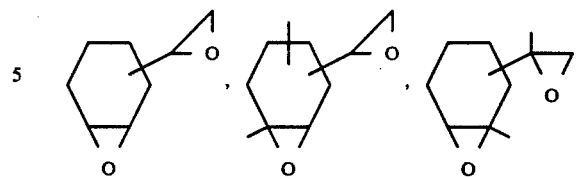

(For example a product under a trade name of "Celoxide" of Daicel Chemical Industries, Ltd. may be cited),

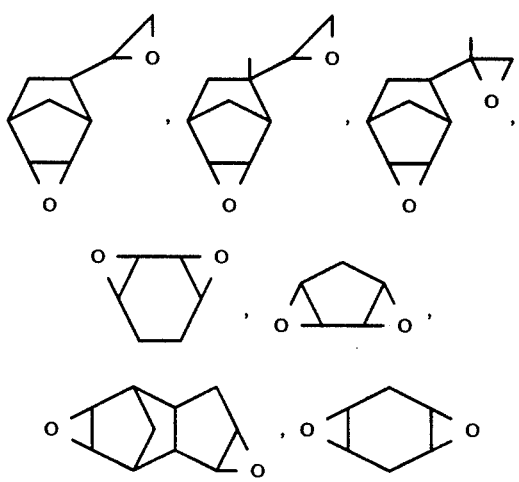

Specifically, at least one kind of said epoxy compound is subjected to ring-opening polymerization, as required in the presence of a polymerization initiator and a catalyst in the same way as in the first process for the production mentioned above and the reaction is suspended at the predetermined reaction stage in which epoxy groups are remaining to thereby obtain the epoxy resin (B). For suspending the reaction, optional means such as dilution with a solvent and cooling may be used. In this process for the production, said other epoxy compound may be copolymerized as in said first process for the production as well.

The so obtained epoxy resin (B) may be an epoxy resin having at least one kind of the epoxy functional group shown by said formula (I) or (II) and at least one kind of the epoxy functional group shown by said formula (III) or (IV) in the same molecule or different molecules.

The so obtained ring-opened polymer [the epoxy resin (B)] preferably has a number average molecular weight within the range of generally 400 to 100,000, especially 700 to 50,000 and conveniently has an epoxy equivalent within the range of generally 100 to 2,000, especially 150 to 500, more especially 150 to 250.

The Third Process for the Production

As a compound having at least one epoxy functional group and a polymerizable unsaturated bond in the same molecule (which may be hereinafter referred to as "a polymerizable epoxy monomer (Z)"), there may be cited, for example, what is represented by the following general formulae 1 to 12.

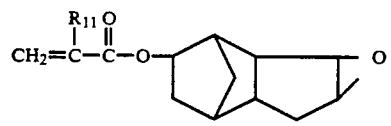  1

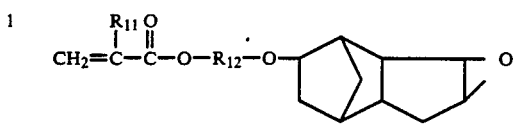  2

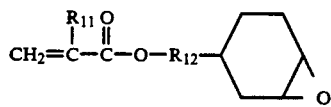  3

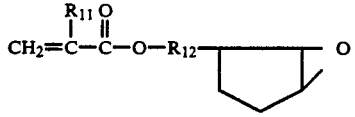  4

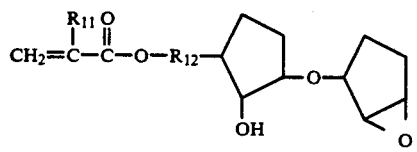  5

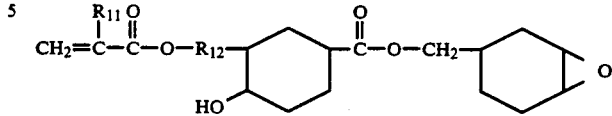  6

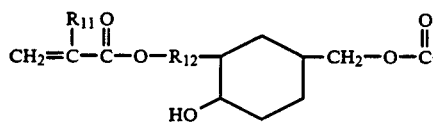  7

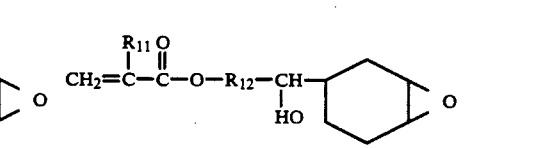  8

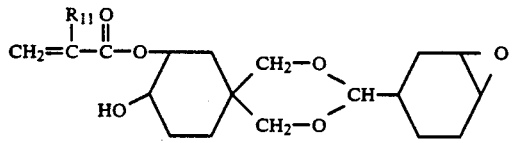  9

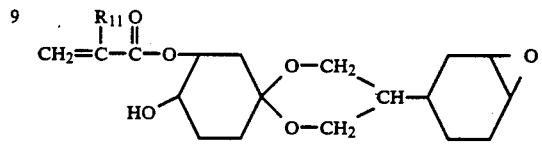  10

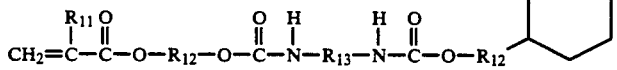  11

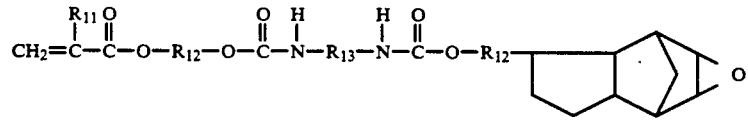  12

In said general formulae, $R_{11}$ represents a hydrogen atom or a methyl group, $R_{12}$ represents a divalent aliphatic saturated hydrocarbon group having 1 to 6 carbon atoms, and $R_{13}$ represents a divalent hydrocarbon group having 1 to 10 carbon atoms.

In the aforesaid copolymerizable epoxy monomers (Z), as a divalent aliphatic saturated hydrocarbon group having 1 to 6 carbon atoms represented by R12, there may be cited a straight chain linear or branched chain alkylene group such as, for example, methylene, ethylene, propylene, tetramethylene, ethylethylene, pentamethylene and hexamethylene. As a divalent hydrocarbon group having 1 to 10 carbon atoms represented by R13, there may be cited, for example, methylene, ethylene, propylene, tetramethylene, ethylethylene, pentamethylene, hexamethylene, polymethylene, phenylene,

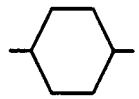

and

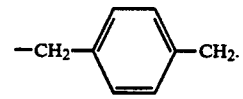

Specific examples of the polymerizable epoxy monomers (Z) represented by the aforesaid general formulae 1 to 12 include 3,4-epoxycyclohexylmethyl acrylate and 3,4-epoxycyclohexylmethyl methacrylate. They are commercially available, for example, under trade names of "METHB" and "AETHB", both products of Daicel Chemical Industries, Ltd. They have the epoxy functional group represented by said formula (I) or (II). Further, 4-vinylcyclohexene oxide may also be used as a polymerizable epoxy monomer.

The epoxy resin (B) may be produced by polymerizing one kind or at least two kinds of monomers selected from these polymerizable epoxy monomers (Z), and at this time, it is also possible to copolymerize the other polymerizable unsaturated monomer.

As the said other polymerizable unsaturated monomer, it may be selected from a broad range according to the properties desired of the resulting (co)polymer. Typical examples of such other polymerizable unsaturated monomer include the following compounds.

(a) Acrylic acid or methacrylic acid esters: for example, alkyl esters having 1 to 18 carbon atoms of acrylic acid or methacrylic acid such as methyl acrylate, ethyl acrylate, propyl acrylate, isopropyl acrylate, butyl acrylate, hexyl acrylate, octyl acrylate, lauryl acrylate, methyl methacrylate, ethyl methacrylate, propyl methacrylate, isopropyl methacrylate, butyl methacrylate, hexyl methacrylate, octyl methacrylate and lauryl methacrylate; alkoxyalkyl esters having 2 to 18 carbon atoms of acrylic acid or methacrylic acid such as methoxybutyl acrylate, methoxybutyl methacrylate, methoxyethyl acrylate, methoxyethyl methacrylate, ethoxybutyl acrylate and ethoxybutyl methacrylate; alkenyl esters having 2 to 8 carbon atoms of acrylic acid or methacrylic acid such as allyl acrylate and allyl methacrylate; hydroxyalkyl esters having 2 to 8 carbon atoms of acrylic acid or methacrylic acid such as 2-hydroxyethyl acrylate, 2-hydroxyethyl methacrylate, hydroxypropyl acrylate and hydroxypropyl methacrylate; and alkenyloxyalkyl esters having 3 to 18 carbon atoms of acrylic acid or methacrylic acid such as allyloxyethyl acrylate and allyloxyethyl methacrylate.

(b) Vinyl aromatic compounds: for example, styrene, alpha-methyl styrene, vinyl toluene and p-chlorostyrene.

(c) Polyolefin type compounds ; for example, butadiene, isoprene and chloroprene.

(d) Others: acrylonitrile, methacrylonitrile, methylisopropenyl ketone, vinyl acetate, VEOBA monomer (a product of Shell Chemicals), vinyl propionate, vinyl pivalate and a compound having a polycaprolactam chain (for example, FM-3X monomer, a trade name of a product of Daicel Chemical Industries, Ltd.)

The ratio of the polymerizable epoxy monomer (Z) to the other polymerizable unsaturated monomer may be optionally selected according to the object, within such a range as to enable the epoxy resin (B) obtained by these copolymerization reactions to contain at least 2, preferably at least 3, more preferably at least 4, epoxy functional groups on average in one molecule. But in order to invest the resulting polymer with sufficient curability, it is especially preferable to make the content of the polymerizable epoxy monomer (Z) in the solids content of said epoxy resin (B) within the range of 5 to 100 % by more preferably 20 to 100 % by weight.

Said third process for the production of the epoxy resin (B) may be carried out in the same manner as the polymerization reaction of ordinary acryl or vinyl resin monomers. As one of such polymerization reactions, a process which comprises dissolving or dispersing the respective monomer components in an organic solvent, and heating the resulting solution or dispersion at a temperature of about 60 to 180° C. with stirring in the presence of a radical polymerization initiator, may be shown. The reaction time may be normally about 1 to 10 hours. As the organic solvent, alcohol solvents, ether solvents, ester solvents and hydrocarbon solvents may be used. When the hydrocarbon solvent is used, it is preferable to use another cosolvent together with it from the standpoint of the solubility. Further, all of usual used radical polymerization initiators may be used. As the specific examples of such radical initiator, there may be exemplified peroxides such as benzoyl peroxide and t-butyl peroxy-2-ethyl hexanoate; and azo compounds such as azobisisobutyronitrile and azobisdimethylvaleronitrile.

It is preferable that the epoxy resin (B) obtained by said third process for the production has a number average molecular weight within the range of generally about 3,000 to about 100,000, especially 4,000 to 10,000.

In the above component (B), what is suitable for use requiring high performance such as cationically electrodepositable paints employed in automobile bodies is one having at least 3 more preferably at least 4, most preferably at least 5 functional groups containing epoxy groups, on average per molecule, having an epoxy equivalent within the range of preferably 100 to 2,000, more preferably 150 to 500, especially preferably 150 to 250, and having a number average molecular weight within the range of preferably 400 to 100,000, more preferably 700 to 50,000, especially preferably 750 to 30,000.

The amount to use the epoxy resin (B) is properly changeable according to the kind of the resin (A) used and within the range from the minimum amount enough to cure the resulting paint film thermally to the maximum amount that does not hurt the bath stability, but generally it is desirably within such a range that the weight ratio of the solids content of the curing resin (B) to the resin (A) becomes 0.2 to 1, especially 0.25 to 0.85, more desirably 0.25 to 0.65.

The resin composition of the present invention may contain the curing resin (B) together with the base resin (A) in advance.

Component (C)

The finely divided gelled polymer (C) in this invention is a cationically electrodepositable finely divided gelled polymer resulting from emulsion polymerization using a cationically reactive emulsifying agent and having a core-sheath structure composed of a core component containing a hydrolyzable alkoxy group and a hydroxyl group and a sheath component composed of an urethane bond and a hydroxyl group. This is good in water dispersion stability and quite effective for improving edge coverability of the electrodeposition coated film composed of the components (A) and (B) without adversely affecting water resistance of the cationically electrodeposition coated film.

Said finely divided gelled polymer is a cationically electrodepositable finely divided gelled polymer obtained by, in the first step, emulsion polymerizing a monomer component (I) comprising (a) a polymerizable unsaturated vinylsilane monomer containing a vinylic double bond and a hydrolyzable alkoxysilane group, (b) a polymerizable monomer containing at least two radically polymerizable unsaturated groups in a molecule, (c) a polymerizable unsaturated monomer containing a vinylic double bond and a hydroxyl group, and (d) the other polymerizable unsaturated monomer using a cationic reactive emulsifying agent containing an allyl group in a molecule; and in the second step, emulsion polymerizing (II) a monomer component composed of (e) a blocked monoisocyanate or polyisocyanate in which at least one isocyanate group in a molecule is blocked with a radically polymerizable monohydroxy compound, (f) a polymerizable unsaturated monomer containing a vinylic double bond and a hydroxyl group, and (g) the other polymerizable unsaturated monomer in the presence of an aqueous finely divided gelled polymer obtained in the first step, said polymer having a core-sheath structure in which the polymerized product of the monomer component (I) is a core and the polymerized product of the monomer component (II) is a sheath.

In the above emulsion polymerization, a water-soluble azoamide compound can be used as a polymerization initiator preferably if required.

The finely divided gelled polymer (C) used in this invention will be described in more detail below.

Monomer Component (I) [Core Component]

The monomer component (I) constituting the core component of the cationically electrodepositable finely divided gelled polymer (C) comprises (a) a polymerizable unsaturated vinylsilane monomer containing a vinylic double bond and a hydrolyzable alkoxysilane group, (b) a polymerizable monomer containing at least two radically polymerizable unsaturated groups in a molecule, (c) a polymerizable unsaturated monomer containing a vinylic double bond and a hydroxyl group, and (d) the other polymerizable unsaturated monomer The vinylsilane monomer (a) is a compound represented by formula $$(R)_3SiQ \qquad (VII)$$

wherein Q denotes a polymerizable unsaturated group such as a gamma-methacryloxypropyl group or a vinyl group, and R denotes an acetoxy group or an alkoxy group having 1 to 8 carbon atoms.

In formula (VII), the "alkoxy group" represented by R is used in a wide sense. Examples of the alkoxy group include ordinary alkoxy groups such as methoxy, ethoxy, propoxy, butoxy, isobutoxy, pentoxy and hexoxy; alkoxyalkoxy groups such as methoxymethoxy and ethoxymethoxy; alkoxyallyloxy groups such as methoxyallyloxy and ethoxyallyloxy; and alkoxyphenoxy groups such as methoxyphenoxy and ethoxyphenoxy. The preferable group of R is the methoxy or ethoxy group. The silane monomer is a monomer known per se and produced similarly to the known monomer. Concrete examples of the silane monomer (a) include vinyltrimethoxysilane, vinyltriethoxysilane, vinyltris(2-methoxyethoxy)silane, gamma-methacryloxypropyltrimethoxysilane and vinyltriacetoxysilane. Among them, gamma-methacryloxypropyltrimethoxysilane is especially preferable.

The polymerizable monomer (b) having at least two radically polymerizable unsaturated groups in the molecule include a polymerizable unsaturated monocarboxylic acid ester of a polyhydric alcohol, a polymerizable unsaturated alcohol ester of a polybasic acid and an aromatic compound replaced with two or more vinyl groups (e.g. divinylbenzene). Examples of the polyhydric alcohol include alkylene glycols having 2 to 6 carbon atoms and aliphatic polyhydric alcohols having 3 to 6 carbon atoms and at least three hydroxyl groups in a molecule, such as glycerol, trimethylolpropane, pentaerythritol and 1,1,1-tris(hydroxymethyl)alkane. Examples of the polymerizable unsaturated monocarboxylic acid that forms an ester therewith include acrylic acid, methacrylic acid and crotonic acid.

Examples of the polybasic acid include cyanuric acid, isocyanuric acid, phthalic acid, terephthalic acid, trimellitic acid, trimesic acid and pyromellitic acid. A typical example of the polymerizable unsaturated alcohol is allyl alcohol.

Thus, examples of the polymerizable monomer (b) include ethylene glycol diacrylate, ethylene glycol dimethacrylate, triethylene glycol dimethacrylate, tetraethylene glycohol dimethacrylate, 1,3-butylene glycol dimethacrylate, trimethylolpropane triacrylate, trimethylolpropane trimethacrylate, 1,4-butanediol diacrylate, neopentylglycol diacrylate, 1,6-hexanediol diacrylate, pentaerythritol diacrylate, pentaerythritol triacrylate, pentaerythritol tetraacrylate, pentaerythritol dimethacrylate, pentaerythritol trimethacrylate, pentaerythritol tetramethacrylate, glycerol dimethacrylate, glycerol diacrylate, glycerol allyloxydimethacrylate, 1,1,1-tris(hydroxymethyl)ethane diacrylate, 1,1,1-tris(hydroxymethyl)ethane triacrylate, 1,1,1-tris(hydroxymethyl)ethane dimethacrylate, 1,1,1-tris(hydroxymethyl)ethane trimethacrylate, 1,1,1-tris(hydroxymethyl)propane diacrylate, 1,1,1-tris(hydroxymethyl)propane triacrylate, 1,1,1-tris(hydroxymethyl)propane dimethacrylate, 1,1,1-tris(hydroxymethyl)propane trimethacrylate, triallyl cyanurate, triallyl isocyanurate, triallyl trimellitate, diallyl terephthalate, diallyl phthalate and divinylbenzene.

The polymerizable monomer (b) having at least two radically polymerizable unsaturated groups in a molecule further include blocked polyisocyanates in which at least two isocyanate groups are blocked by a blocking agent such as a radically polymerizable monohydroxy com pound.

Examples of the polyisocyanates used in the blocked polyisocyanates include aromatic polyisocyanates such as toluene diisocyanate, naphthalene diisccyanate, xylylene diisocyanate, hydrogenated xylylene diisocyanate, diphenylmethane diisocyanate and dibenzyl isocyanate; aliphatic polyisocyanates such as tetramethylene diisocyanate, hexamethylene diisocyanate, dicyclohexyl diisocyanate and isophorone diisocyanate. Polymers and biurets of these polyisocyanate compounds are also available. The above polyisocyanates may be used either singly or in combination of two or more.

The blocking agent used to block the above polyisocyanates includes, for example, a radically polymerizable monohydroxy compound. Concrete examples thereof include $C_2$–$C_6$ hydroxyalkyl (meth)acrylates such as hydroxyethyl (meth)acrylate and hydroxypropyl (meth)acrylate, tri- or tetra-propylene glycol mono(meth)acrylate, trimethylolpropane di(meth)acrylate and pentaerythritol tri(meth)acrylate.

The above polymerizable monohydroxy compound can be used together with the other blocking agent. The other blocking agent includes saturated or unsaturated monoalcohols containing at least 6 carbon atoms, cellosolves, carbitols and oximes. Concrete examples thereof are saturated monoalcohols such as hexanol, nonanol, decanol, lauryl alcohol, stearyl alcohol and 2-ethylhexanol; unsaturated monoalcohols such as oleyl alcohol and linolenyl alcohol; cellosolves such as methyl cellosolve, ethyl cellosolve, butyl cellosolve and hexyl cellosolve; carbitols such as methyl carbitol, ethyl carbitol and butyl carbitol; and oximes such as methyl ethyl ketoxime and cyclohexanone oxime.

Most preferable in the polymerizable monomer (b) are ethylene glycol diacrylate, 1,6-hexanediol diacrylate, trimethylolpropane trimethacrylate, pentaerythritol tri acrylate, blocked isophorone diisocyanate/2- hydroxyethyl acrylate and blocked hexamethylene diisocyanate/2-hydroxyethyl methacrylate.

The polymerizable unsaturated monomer (c) having the vinylic double bond and the hydroxyl group is a monomer component that serves to introduce the hydroxyl group into the finely divided gelled polymer, and the hydroxyl group being introduced acts as a hydrophilic group in producing the finely divided gelled polymer or a functional group in the reaction of cross-linking between dispersed particles. Preferable examples of the unsaturated monomer (c) include $C_2$–$C_6$ hydroxyalkyl (meth)acrylates such as 2-hydroxyethyl (meth)acrylate and 1-, 2- or 3-hydroxypropyl (meth)acrylate.

The other polymerizable unsaturated monomer of the monomer (d) is the rest of the monomer component (A) constituting the core component of the finely divided gelled polymer. Examples thereof can be known monomers used to form ordinary acrylic resins, for example, alkyl (preferably $C_1$–$C_{18}$ alkyl) (meth)acrylates such as methyl (meth)acrylate, ethyl (meth)acrylate, propyl (meth)acrylate, isopropyl (meth)acrylate, butyl (meth)acrylate, hexyl (meth)acrylate, octyl (meth)acrylate, lauryl (meth)acrylate and cyclohexyl acrylate; polymerizable unsaturated nitrile monomers such as (meth)acrylonitrile; vinyl aromatic monomers such as styrene, alpha-methylstyrene and vinyl toluene; (meth)acrylamide; and (meth)acrylic acid amide derivatives such as (meth)acrylamide N-derivatives. These monomers are properly selected depending on the desirous characteristics and may be used either singly or in combination of two or more.

The proportions of the monomers (a) to (d) constituting the monomer component (A) [core component]of the finely divided gelled polymer in this invention are not strictly limited and can be varied depending on the desirous properties of the finely divided gelled polymer. Generally, they can be within the following range.

| Monomer (a): | 0.5 to 10% by weight, preferably 1 to 5% by weight |
|---|---|
| Monomer (b): | 1 to 50% by weight, preferably 3 to 40% by weight |
| Monomer (c): | 1 to 30% by weight, preferably 2 to 10% by weight |
| Monomer (d): | 10 to 97.5% by weight, preferably 45 to 94% by weight. |

Monomer Component (II) [Sheath Component]

The monomer component (II) constituting the sheath component of the cationically electrodepositable finely divided gelled polymer (C) comprises (e) a blocked monoisocyanate or polyisocyanate in which at least one isocyanate group in a molecule is blocked with a radically polymerizable monohydroxy compound, (f) a polymerizable unsaturated monomer having a vinylic double bond and a hydroxyl group, and (g) the other polymerizable unsaturated monomer.

The blocked mono- or poly-isocyanate (e) in which at least one isocyanate group is blocked with the radically polymerizable monohydroxy compound, said isocyanate (e) constituting the monomer component (B), is an important component to improve the prevention of cissing, edge coverability the adhesion and the chipping resistance of the cationically electrodeposition-coated film without impairing the water resistance, the corrosion resistance and the coated surface smoothness of the coated film.

Examples of the monoisocyanate in the component (e) include aromatic monoisocyanates such as phenyl isocyanate, p-chlorophenyl isocyanate, o-chlorophenyl isocyanate, m-chlorophenyl isocyanate, 3,4-dichlorophenyl isocyanate and 2,5-dichlorophenyl isocyanate; and aliphatic monoisocyanates such as methyl isocyanate, ethyl isocyanate, n-butyl isocyanate, n-propyl isocyanate and octadecyl isocyanate. These monoisocyanates may be used either singly or in combination of two or more.

The polyisocyanates can be the same as those in the polymerizable monomer (b).

The blocking agent used to block the mono- and poly-isocyanates can be also the same as that in the polymerizable monomer (b).

Preferable examples of the blocked mono- or polyisocyanate (e) include blocked isophorone diisocyanate/2-hydroxyethyl acrylate/methyl ethyl ketoxime, blocked isophorone diisocyanate/2-hydroxyethyl acrylate/methyl isobutyl ketoxime, blocked toluylene diisocyanate/2-hydroxyethyl acrylate/methyl isobutyl ketoxime and isocyanurate-type blocked hexamethylene diisocyanate/2-hydroxyethyl acrylate/methyl isobutyl ketoxyme.

The polymerizable unsaturated monomer (f) having the vinylic double bond and the hydroxyl group can be the aforesaid examples of the unsaturated monomer (c) in the monomer component (I), for example, $C_2$–$C_6$ hydroxyalkyl (meth)acrylates such as 2-hydroxyethyl (meth)acrylate and 1-, 2- or 3-hydroxypropyl (meth)acrylate.

The other polymerizable unsaturated monomer (g) is the rest of the monomer component (II) constituting the sheath component of the finely divided gelled polymer. Examples of the monomer (g) can be, like examples of the polymerizable unsaturated monomer (d) in the monomer component (I), known monomers used to form ordinary acrylic resins, such as alkyl (meth)acrylate monomers, polymerizable unsaturated nitrile monomers, vinyl aromatic monomers and (meth)acrylic acid amide derivatives. They may be used either singly or in combination of two or more.

The proportions of the monomers (e) to (g) constituting the monomer component (II) [sheath component] are not strictly limited and can be varied depending on the desirous properties of the resulting finely divided gelled polymer. Generally, they can be within the following range.

| Monomer (e): | 10 to 40% by weight, preferably 15 to 30% by weight |
|---|---|
| Monomer (f): | 1 to 30% by weight, preferably 2 to 10% by weight |
| Monomer (g): | 30 to 89% by weight, preferably 60 to 83% by weight |

It has been found that when a combination of (g-1) a polymerizable unsaturated monomer having an amino group in a molecule, and (g-2) the other polymerizable unsaturated monomer, particularly, at least one monomer selected from alkyl (meth)acrylates, polymerizable unsaturated nitrile monomers and vinyl aromatic monomers is used as the polymerizable unsaturated monomer (g), there is obtained a cationically electrodepositable finely divided gelled polymer of a core-sheath structure especially useful as a rheology controlling agent to exhibit an excellent edge covering property with the small amount of the polymer being added to a cationically electrodepositable paint.

Examples of the polymerizable unsaturated monomer (g-1) having the amino group in the molecule include a (meth)acrylic monomer in which an ester moiety of a (meth)acrylate ester contains a substituted or unsubstituted amino group, and an amino group-containing (meth)acrylic monomer in which an amido moiety of (meth)acrylic acid contains a substituted amino group.

Especially suitable is at least one type selected from an aminoalkyl (meth)acrylate and an aminoalkyl (meth)acrylamide represented by formulas (VIII) and (IX)

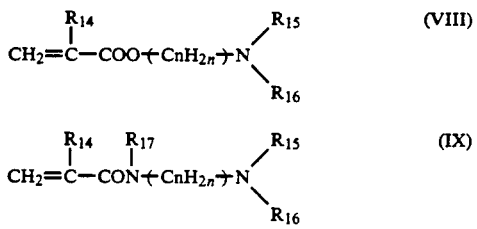

wherein $R_{14}$ denotes a hydrogen atom or a methyl group, $R_{15}$ and $R_{16}$, independently from each other, denote a hydrogen atom or a lower alkyl group, $R_{17}$ denotes a hydrogen atom or a lower alkyl group, and n is an integer of 2 to 8.

The word "lower" here referred to means that the number of carbon atoms of the group to which this word is applied is 6 or less, preferably 4 or less.

Regarding concrete examples of such amino group-containing (meth)acrylic monomer, examples of the aminoalkyl (meth)acrylate represented by formula (VIII) include N,N-dimethylaminoethyl (meth)acrylate, N,N-diethylaminoethyl (meth)acrylate, N-t-butylaminoethyl (meth)acrylate, N,N-dimethylaminopropyl (meth)acrylate, N,N-dimethylaminobutyl (meth)acrylate, N-propylaminoethyl (meth)acrylate and N-butylaminoethyl (meth)acrylate. Examples of the aminoalkyl (meth)acrylamide represented by formula (IX) include N,N-dimethylaminoethyl (meth)acrylamide and N,N-dimethylaminopropyl (meth)acrylamide.

Examples of the alkyl (meth)acrylate monomer which may be used in combination with the monomer (g-1) include $C_1$-$C_{18}$ alkyl esters of (meth)acrylic acid such as methyl (meth)acrylate, ethyl (meth)acrylate, propyl (meth)acrylate, isopropyl (meth)acrylate, butyl (meth)acrylate, hexyl (meth)acrylate, octyl (meth)acrylate, lauryl (meth)acrylate and cyclohexyl acrylate.

The polymerizable unsaturated nitrile monomer includes, for example, (meth)acrylonitrile, and the vinyl aromatic monomer includes, for example, styrene, alpha-methylstyrene and vinyl toluene. These monomers are also properly selected depending on the desirous characteristics. They may be used either singly or in combination of two or more.

The proportions of (e), (f), (g-1) and (g-2) constituting the sheath portion (II) in case of using a combination of the monomers (g-1) and (g-2) as the monomer (g) are not strictly limited either and can be varied depending on the desirous properties of the resulting finely divided gelled polymer. They can generally be within the following range.

| Monomer (e): | 10 to 40% by weight, preferably 15 to 30% by weight |
|---|---|
| Monomer (f): | 1 to 30% by weight, preferably 2 to 10% by weight |
| Monomer (g-1): | 1 to 10% by weight, preferably 2 to 5% by weight |
| Monomer (g-2): | 20 to 88% by weight, preferably 55 to 81% by weight |

Preparation of a Finely Divided Gelled Polymer

It is also one of the important requirements in this invention to select the proportions of the monomer component (I) [core component] and the monomer component (II) [sheath component]. In this invention, it is advisable that the weight ratio ((I)/(II)) of the sum of the monomer component (I) to the sum of the monomer component (II) is usually 10/90 to 90/10, preferably 40/60 to 60/40. If the (I)/(II) weight ratio is less than 10/90 or more than 90/10, the edge covering property of the resulting baked, coated film tends to decrease.

In this invention, a typical example of the cationic reactive emulsifying agent having an allyl group in a molecule which is used in emulsion polymerizing the monomer component (I) is a quaternary ammonium salt-containing reactive emulsifying agent represented by formula (X)

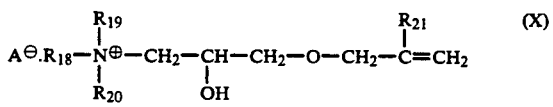

wherein $R_{18}$ denotes a hydrocarbon group with 8 to 22 carbon atoms that may have a substituent, $R_{19}$ and $R_{20}$ each denote an alkyl group with 1 to 3 carbon atoms, $R_{21}$ denotes a hydrogen atom or a methyl group, and $A^-$ denotes a monovalent anion. The above emulsifying agent is known per se (refer to e.g. Japanese Laid-open Patent Application No. 78,947/1985). For example, an emulsifying agent commercially available under the tradename "Ratemuru K-180" of Kao Corporation can be taken. In the finely divided gelled polymer (C), this invention, a cationic reactive emulsifying agent that is gradually incorporated into a polymer during the polymerization is especially preferable. Any cationic reactive emulsifying agent containing an allyl group of a relatively low reactivity can widely be used; the aforesaid emulsifying agents are not critical. The amount of the allyl group-containing cationic reactive emulsifying agent is not strictly limited and can be changed depending on the type of the monomer component (I) and the desirous properties of the resulting finely divided gelled polymer. It is usually 0.1 to 30 parts by weight, preferably 0.5 to 5 parts by weight per 100 parts by weight of the solids content of the finely divided gelled polymer.

Especially preferable as a polymerization initiator is a water-soluble azoamide compound represented by formula (XI) or (XII),

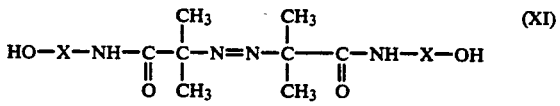

wherein X denotes a linear or branched alkylene group with 2 to 12 carbon atoms, or

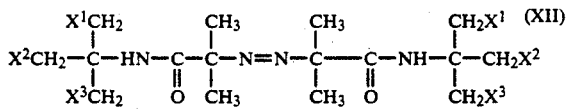

wherein at least one of $X^1$, $X^2$ and $X^3$ denotes a hydroxyl group and the others denote hydrogen.

These compounds are known per se (refer to e.g. Japanese Laid-open Patent Application No. 218,618/1986 and No. 63,643/1986). For example, a polymerization initiator commercially available under the tradename "VA Series" of Wako Pure Chemical Ind., Ltd. is taken. The polymerization initiator can be used in an amount commonly employed in said technical field. It is usually 0.1 to 1.5 parts by weight, preferably 0.5 to 1.5 parts by weight per 100 parts by weight of the solids content of the finely divided gelled polymer.

Copolymerization of the unsaturated monomers (a) to (d) and (e) to (g) can be conducted by an emulsion polymerization method known per se for producing an acrylic copolymer. First, the mixture [monomer component (I)] of the above monomers (a) to (d) is, for example, reacted usually at a reaction temperature of about 50 to about 100° C. for about 1 to about 20 hours in an aqueous medium in the presence of an allyl group-containing cationic reactive emulsifying agent and a water-soluble azoamide compound as a reaction initiator to form an aqueous finely divided gelled polymer.

Subsequently, the mixture [monomer component (II)] of the monomers (e) to (g) is added and the reaction further continues at a reaction temperature of about 50 to about 100° C. for about 1 to about 20 hours. There can be obtained a cationically electrodepositable finely divided gelled polymer having a core-sheath structure in this invention.

The aqueous dispersion of the cationically electrodepositable finely divided gelled polymer (C) has usually the resin solids content of about 10 to 40% by weight based on the total weight. The finely divided gelled polymer (C) can have a particle size of usually 500 nm or less, preferably 10 to 300 nm, more preferably 50 to 100 nm. The particle size can be adjusted by adjusting the amount of the cationically reactive emulsifying agent containing an allyl group in a molecule; a desirable amount can readily be obtained.

The amount of the finely divided gelled polymer (C) can properly be changed depending on the types of the resin (A) and the epoxy resin (B). It is usually 5 to 30 % by weight, preferably 8 to 20% by weight, more preferably to % by weight as a solids content based on the total weight of the resin (A) and the epoxy resin (B).

A method for preparing this composition is not particularly limited; this composition can be obtained basically by dispersing the components (A), (B) and (C) in water and preferably by stably dispersing the components (A) and (B) in water and then mixing the dispersion with the water dispersion (C).

As requested, the composition may contain a color pigment such as carbon black, titanium white, white lead, lead oxide and red iron oxide; an extender pigment such as clay and talc; an anticorrosive pigment such as strontium chromate, lead chromate, basic lead chromate, red lead, lead silicate, basic lead silicate, lead phosphate, basic lead phosphate, lead tripolyphosphate, lead silicochromate, chrome yellow, lead cyanamide, calcium plumbate, lead suboxide, lead sulfate and basic lead sulfate; and other additives. As the other additives, a small amount of a dispersant or a nonionic surface active agent as a cissing preventing agent of the coated surface and a curing promotor may be taken.

Especially, for making an electrodeposited paint on sufficiently curable at a low temperature of not more than 160° C., it is effective to add one kind or at least two kinds of metal compound selected from among a lead compound, a zirconium compound, a cobalt compound, an aluminum compound, a manganese compound, a copper compound, a zinc compound, an iron compound, a chromium compound and a nickel compound as a catalyst.

Specific examples of these metal compounds include chelated compounds such as zirconium acetyl acetonate, cobalt acetyl acetonate, aluminum acetyl acetonate and manganese acetyl acetonate; a chelation reaction product of compounds having beta-hydroxyamino structures with lead oxide (II); and carboxylates such as lead 2-ethyl hexanoate, lead oenanthate, naphthex lead, lead octanoate, lead benzoate, lead acetate, lead lactate, lead formate, lead glycoate and octanoate zirconium.

Said metal compounds may be used in an amount calculated as a metal content based on the weight of the total solids content of the base resin (A) and the epoxy resin (B) of generally not more than 10% by weight, preferably not more than 5% by weight.

The thickness of a paint film obtained by electrodepositing the so prepared resin composition for a cathodically electrodepositable paint of the present invention on a proper substrate is not strictly restricted, however, generally, the thickness within the range of 3 to 300 microns based on the cured paint film is suitable, and the paint film can be cured with heating at a temperature of, for example, 70 to 250° C., preferably 120 to 160° C.

A method of forming an electrodeposited paint film on the substrate using the resin composition for a cathodically electrodepositable paint of the present invention is not particularly restricted, but ordinary conditions for cathodically electrodepositing may be used. For example, the resin (A) and the epoxy resin (B) according to this invention are, as mentioned above, dispersed in water and then blended with the finely divided gelled polymer (C), the resulting aqueous dispersion is blended with, as required, pigments, a curing catalyst and other additives, further, the mixture is diluted to the concentration of the solids content of the bath within the range of 5 to 40% by weight, preferably 10 to 25% by weight, and the bath pH is adjusted within the range of 5 to 8, preferably 5.5 to 7. Next, using this electrodeposition bath, electrodeposition is carried out under the following conditions with, for example, a carbon plate (5 cm×15 cm×1 cm) being used as an anode and for example, a zinc phosphated steel (5 cm ×15 cm×0.7 mm) being used as a cathode.

| Bath temperature: | 20 to 35° C., preferably 25 to 30° C. |
| --- | --- |
| Direct current | |
| Current density: | 0.005 to 2 A/cm², preferably 0.01 to 1 A/cm² |
| Voltage: | 10 to 500 V, preferably 100 to 300 V |
| Power feeding time: | 0.5 to 5 min., preferably 2 to 3 min. |

After the electrodeposition coating, the coated object is drawn up from the electrodeposition bath, rinsed with water, and then heat-cured by heating as mentioned above.

The electrodeposition-coated heat-cured film formed with this composition is excellent in adhesion, smoothness and edge coverability. This is presumably because in crosslinking and curing of the coated film by the reaction of the components (A) and (B), by-products are little formed and volume shrinkage of the coated film does not occur so that both adhesion and smoothness are good. Meanwhile, it is supposed that the component (c) has a hydroxyl group effectively introduced into the polymer from a water-soluble azoamide compound as a polymerization initiator by chemical bonding and the hydrogen bonding based on the hydroxyl group gives a false network structure of the finely divided gelled polymer [component (C)] which structure becomes directly a network structure by ether linkage in heating the coated film to prevent the coated film from melt-flowing and improve edge coverability. By blending the component (C), decrease in smoothness of the coated film is little observed. Moreover, the hydroxyl group of the component (C) is most likely reacted with the epoxy group of the component (B). Besides, as affinity for water is good, stability in water is also good.

The component (e) used to prepare the component (C) is an important component to improve prevention of cissing, edge coverability, adhesion, and chipping resistance of the cationically electrodeposition coated film without impairing water resistance, corrosion resistance and smoothness of the coated surface.

The following examples will illustrate this invention more specifically. Parts and percentages in said examples are all by weight.

I. PRODUCTION EXAMPLES

1. Preparation of Resin (A)

(1) Resin (A-1)

Bisphenol A type epoxy resin having an epoxy equivalent of 950 (trade name "Epicoat 1004", a product of Shell Chemicals Co., Ltd.) (1900 parts) was dissolved in 993 parts of butyl cellosolve. To the resulting solution, 210 parts of diethanol amine was added dropwise at a temperature of 80 to 100° C., and then the resultant mixture was maintained at 100° C. for 2 hours to obtain a base resin (A-1) having a primary hydroxyl equivalent of 528 and an amine value of 53.

(2) Resin (A-2)

To 39 parts of monoethanol amine maintained at 60° C. in a reactor, 100 parts of N,N-dimethylaminopropylacrylamide was added dropwise, and the mixture was reacted at 60° C. for 5 hours to obtain a monoethanolamine adduct of N,N-dimethylaminopropylacrylamide.

Separately, a reactor was charged with 950 parts of bisphenol A diglycidylether having an epoxy equivalent of 190, 340 parts of propylene glycol diglycidylether having an epoxy equivalent of 340, 456 parts of bisphenol A and 21 parts of diethanolamine, and the content was heated to 120° C. and reacted until the epoxy value became 1.02 mmole/g. Then the reaction product was diluted with 479 parts of ethylene glycol monobutyl ether and cooled. While the reaction system was maintained at 100° C., 158 parts of diethanol amine and 43 parts of a monoethanol amine adduct of said N,N-dimethylaminopropylacryl amide were added thereto, and the resulting mixture was reacted until the viscosity ceased to raise to obtain a resin (A-2) having a resin solids content of 80%, a primary hydroxyl group equivalent of 518 and an amine value of 54.

(3) Resin (A-3)

A reactor was charged with 950 parts of bisphenol A diglycidyl ether having an epoxy equivalent of 190, 330 parts of an epoxy resin XB-4122 (a trade name of a product of Ciba Geigy Ltd.) having an epoxy equivalent of 330, 456 parts of bisphenol A and 21 parts cf diethanol amine. The content was heated to 120° C. and reacted until the epoxy value became 1.02 mmole/g. Then the reaction product was diluted with 489 parts of ethylene glycol monobutyl ether and cooled. Thereafter, while the reaction system was maintained at 90° C., 126 parts of diethanol amine, 53.5 parts of monoethanol amine adduct of said N,N-dimethylaminopropylacryl amide and 18.5 parts of N-methylaminoethanol were added thereto, and the resulting mixture was reacted until the viscosity ceased to rise to obtain a resin (A-3) having a resin solids content of 80%, a primary hydroxyl group equivalent of 592 and an amine value of 55.

2. Preparation of Epoxy Resin (B)

(1) Epoxy Resin (B-1)

32.6 parts of "EHPE 3150"[trade name of the epoxy resin having an epoxy equivalent of 175 to 195, a product of Daicel Chemical Industries, Ltd.] and 8.2 parts of propylene glycol monomethyl ether were dissolved under heating at 100° C. to obtain 40.8 parts of an epoxy resin (B-1) having a solids content of 80% and an epoxy equivalent of 190. Said curing resin had a number average molecular weight of about 1,500.

(2) Epoxy Resin (B-2)

To a mixture of 136 parts of vinyl ncrbornene oxide, 124 parts of 4-vinylcyclohexene-1-oxide and 18 parts of trimethylol propane, 200 parts of a 10% ethyl acetate solution of BF3-etherate were added dropwise at 50° C. over 4 hours to carry out ring-opening polymerization. The resultant ring-opened polymer was added with ethyl acetate, and washed with water, the ethyl acetate layer was concentrated, and then 130 parts of ethyl acetate was added anew and dissolved. 160 parts of peracetic acid was made into an ethyl acetate solution and added dropwise at 50° C. over 5 hours, and the resultant mixture was matured for 2 hours to carry out an epoxidation reaction. After removing acetic acid, ethyl acetate and peracetic acid, the remaining epoxidation product was dissolved in 500 parts of ethyl acetate at 40° C., followed by washing with 250 parts of distilled water 4 times. Then ethyl acetate was removed, and the matured product was dissolved in 78 parts of propylene glycol monoethyl ether at 80° C. to obtain an epoxy resin (B-2) having a solids content of 80% and an epoxy equivalent of 202. Said curing resin had a number average molecular weight of about 1,300.

(3) Epoxy Resin (B-3)

To a mixture of 304 parts of partially epoxidized lemonene (2-methyl-4-isopropenyl-1-cyclohexene oxide) and 18 parts of trimethylol propane, 200 parts of a 10% ethyl acetate solution of BF3-etherate was added dropwise at 50° C. over 4 hours. The treatment thereafter was carried out as in the epoxy resin (B-2), and the matured product was dissolved in 80 parts of ethylene glycol monobutyl ether at 80° C. to obtain an epoxy resin (B-3) having a solids content of 80% and an epoxy equivalent of 205. Said epoxy resin had a number average molecular weight of about 1,000.

(4) Epoxy Resin (B-4)

The process (2—2) for producing an epoxy resin (B-2) was repeated except that 304 parts of 2,4- or 1,4-dimethyl-4-ethenyl-1-cyclohexane oxide was used to obtain an epoxy resin (B-4) having a solids content of 80% and an epoxy equivalent of 199. Said epoxy resin had a number average molecular weight of about 950.

(5) Epoxy Resin (B-5)

To a mixture of 460 parts of "Celoxide 3000"

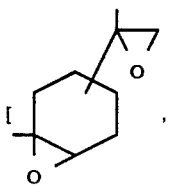

a trade name of a product of Daicel Chemical Industries, Ltd.], 0.3 part of aluminum acetyl acetonate and 5 parts of tetraethoxy silane, 0.1 part of distilled water were added, the mixture was maintained at 80° C. for 1 hour, and then reacted at 120° C. for 3 hours. To the reaction product was added 116 parts of ethylene glycol monobutyl ether to obtain an epoxy resin (B-5) having a solids content of 80% and an epoxy equivalent of 280. Said curing resin has a number average molecular weight of about 1,100.

(6) Epoxy Resin (B-6)

132 parts of a cyclopentadiene dimer was dissolved in 70 parts of ethyl acetate. To the resulting solution, 160 parts of peracetic acid as an ethyl acetate solution was added dropwise at 35° C. over 7 hours, and the mixture was further matured at 40° C. for 6 hours. After removal of acetic acid, ethyl acetate and peracetic acid, the matured product was dissolved at 40° C. in 500 parts of ethyl acetate, followed by washing with 250 parts of distilled water 5 times. Then ethyl acetate was removed and the matured product was dissolved at 80° C. in 43 parts of methylisobutyl ketone to obtain a compound (B-6-1) having a solids content of 80% and an epoxy equivalent of 90. 94 parts of 4-Vinylcyclohexene was dissolved in 75 parts of ethyl acetate. To the resulting solution, 160 parts of peracetic acid made into an ethyl acetate solution was added dropwise at 50° C. over 4 hours, and further matured at 50° C. for 2 hours. After removal of acetic acid, ethyl acetate and peracetic acid, the matured product was dissolved in 500 parts of ethyl acetate at 40° C., followed by washing with 250 parts of distilled water 5 times. Then ethyl acetate was removed, and the matured product was dissolved at 80° C. in 32 parts of methylisobutyl ketone to obtain a compound (B-6-2) having a solids content of 80% and an epoxy equivalent of 65. To a mixture of 225 parts of the compound (B-6-1) and 163 parts of the compound (B-6-2), 0.2 part of aluminum acetyl acetonate and 10 parts of trimethylol propane were added, and the resulting mixture was maintained at 100° C. for 1 hour, and then reacted at 150° C. for 3 hours. Then 60 parts of ethylene glycol monobutyl ether was added to cool the system to thereby obtain an epoxy resin (B-6) having a solids content of 70% and an epoxy equivalent of 210. Said curing resin had a number average molecular weight of about 1,100.

(7) Epoxy Resin (B-7)

2 parts of Azobisdimethylvaleronitrile dissolved in 33.4 parts of METHB monomer (3,4-epoxycyclohexyl-methyl methacrylate) was added dropwise to a mixed solvent of 10 parts of methylisobutyl ketone and 10 parts of butyl cellosolve heated at 100° C. over 2 hours. The resulting mixture was matured for 1 hour, and then heated to 125° C., at which temperature the matured mixture was further matured for 1 hour to obtian 54 parts of an epoxy resin (B-7) having a solids content of 60% and an epoxy equivalent of 196. Said curing resin had a number average molecular weight of about 10,000.

(8) Epoxy Resin (B-8)

2.4 parts of Azobisdimethylvaleronitrile dissolved in a mixture of 32.0 parts of an METHB monomer and 8.0 parts of hydroxyethyl acrylate was added dropwise to 24 parts of butyl cellosolve heated at 100° C. over 2 hours, and matured for 1 hour. Then the system was heated at 125° C., and again matured for 1 more hour to obtain 64.8 parts of an epoxy resin (B-8) having a solids content of 60% and an epoxy equivalent of 245. Said curing resin had a number average molecular weight of about 12,000.

(9) Epoxy Resin (B-9)

2.4 parts of Azobisdimethylvaleronitrile dissolved in a mixture of 37 parts of 3,4-epoxycyclohexylmethyl acrylate and 3 parts of hydroxyethyl acrylate was treated in the same way as in the preceding process for the production of an epoxy resin (B-2) to obtain an epoxy resin (B-9) having a solids content of 60% and an epoxy equivalent of 200. Said curing resin had a number average molecular weight of about 15,000.

3. Preparation of a Blocked Mono-or Polyisocyanate Compound Used in the Monomer Component (II)

(1) Isocyanate (e-1)

A 2-liter flask fitted with a stirrer, an air introduction tube, a condensing pipe and a thermostat was charged with 222 parts of isophorone diisocyanate and 50 parts of methyl isobutyl ketone. While blowing a dry air into a liquid phase, they were stirred and heated to 70° C. To the mixture was added 0.3 part of dibutyltin dilaurate, followed by adding dropwise 116 parts of 2-hydroxyethyl acrylate for 1 hour. Even after the dropwise addition, the temeprature was kept at 70° C. for 1 hour. Subsequently, 115 parts of methyl isobutyl ketoxime was added dropwise for 1 hour. Even after the dropwise addition, heating was conducted to keep the temperature at 70° C. The reaction mixture was collected with the lapse of time. Absorption of -NCO was ascertained by IR. A time when absorption of -NCO disappeared was made the termination of the reaction. There was obtained a blocked 90% isophorone diisocyanate/2-hydroxyethyl acrylate/methyl isobutyl ketoxime solution (e-1). The 70 % solids content buble viscosity (solvent composition: 10 % of methyl isobutyl ketone and 20% of n-butyl acrylate) was DE.

(2) Isocyanates (e-2) and (e-3)

The process (1) above for preparation of an isocyanate (e-1) was repeated except using starting materials shown in Table 1 to obtain 90% solutions of various radically polymerizable blocked isocyanate monomers. The 70% solids content bubble viscosities of these monomers are shown in Table 1.

TABLE 1

| Starting material | Isocyanate (e-2) | Isocyanate (e-3) |
|---|---|---|
| methyl isobutyl ketone | 47 | 47 |
| Dibutyltin dilaurate | 0.3 | 0.3 |
| Isophorone diisocyanate | 222 | |
| Hydrogen xylirenediisocyanate | | 194 |
| 2-Hydroxyethyl acrylate | 116 | 116 |
| methyl isobutyl ketoxime | | 115 |
| methyl ethyl ketoxime | 87 | |
| 70% solids content bubble viscosity *1 | G+ | FG |

*1 Solvent composition: methye isobutyl ketone 10% n-butyl acrylate 20%

4. Production of Finely Divided Gelled Polymer (C)

(1) Finely Divided Gelled Poplymer (C-1)

A flask fitted with a stirrer, a thermometer, a condensing pipe and a heating mantle was charged with 700 parts of deionized water and 162 parts of Ratemuru K-180 (a tradename for a product of Kao Corporation, 25% aqueous solution). With stirring, they were heated to 90° C. To the mixture was added 20% of an aqueous solution of 2 parts of VA-086 (a tradename for a product of Wako Pure Chemical Ind., Ltd.) as a polymerization initiator in 100 parts of deionized water. Fifteen minutes later, 10 parts of the mixture of the following monomers as the monomer component (I) was added.

| | parts |
|---|---|
| Styrene | 32 |
| n-Butyl acrylate | 32 |
| 1,6-Hexanediol diacrylate | 30 |
| 2-Hydroxyethyl acrylate | 4 |
| KBM-503* | 2 |

*a tradename for gamma-methacryloxypropyl trimethoxy silane of Shin-Etsu Chemical Co., Ltd.

Subsequently, the mixture was further stirred for 30 minutes, and the remaining monomer mixture as the monomer component (I) and the aqueous solution of the polymerization initiator began to be added dropwise. The monomer mixture as the monomer component (I) was fed over 1.5 hours and the aqueous solution of the polymerization initiator over 4.5 hours respectively. While keeping the polymerization temperature at 90° C. for 1 hour even after the dropwise addition of the monomer mixture as the monomer component (I), the mixture of the following monomers as the monomer component (II) began to be added dropwise.

| | parts |
|---|---|
| Styrene | 38 |
| n-Butyl acrylate | 38 |
| 2-Hydroxyethyl acrylate | 4 |
| Monomer solution (e-1) obtained in Production Example 3 | 22 |

The monomer mixture as the monomer component (II) was fed over 1.5 hours. Even after the dropwise addition of the aqueous solution of the polymerization initiator, heating was conducted for 30 minutes to keep the temperature at 90° C. Thereafter, the temperature was lowered to room temperature, and the reaction mixture was filtered via a filter cloth. There resulted a finely divided gelled polymer dispersion (C-1) having a solids content of 20.0%, pH of 3.9, a viscosity of 50 cps (BM-type rotary viscometer, No. 2 spindle) and an average particle size of 74 nm (measured by Nanosizer N-4 manufactured by Coulter Co).

(2) Finely Divided Gelled Polymers (C-2) to (C-8)

Emulsion polymerization was performed as in the preparation of the finely divided gelled polymer (C-1) except that the initial amount of deionized water, the type of the polymerization initiator, the composition of the monomer component (I), the composition of the monomer component (II) and the component (I) to component (II) ratio were changed as shown in Table 2. There resulted dispersions of finely divided gelled polymers having properties shown in Table 2.

TABLE 2

| | (c-2) | (c-3) | (c-4) |
|---|---|---|---|
| Initial amount of deionized water | 700 | 700 | 700 |
| Ratemuru K-180 #1 | 16 | 16 | 16 |
| Type of polymerization initiator *2 | VA-086 | VA-086 | VA-080 |
| Monomer component (I) | | | |
| Styrene | 32 | 32 | 32 |
| n-Butyl acrylate | 32 | 32 | 32 |
| 1,6-hexanediol diacrylate | 30 | 30 | 30 |
| 2-Hydroxyethyl acrylate | 4 | 4 | 4 |
| KBM-503 | 2 | 2 | 2 |
| Monomer component (II) | | | |
| Styrene | 38 | 38 | 38 |
| n-Butyl acrylate | 38 | 38 | 38 |
| 2-Hydroxyethyl acrylate | 4 | 4 | 4 |
| N,N'-dimethylaminoethyl methacrylate | | | |
| N,N'-dimethylaminopropyl methacrylate | | | |
| Isocyanate (e-1) solution | | | |
| Isocyanate (e-2) solution | 22 | | 22 |
| Isocyanate (e-3) solution | | 22 | |
| Component (I)/Component (II) ratio | 50/50 | 50/50 | 50/50 |
| Properties of finely divided gelled polymer dispersion | | | |
| Solids content (%) | 19.9 | 20.0 | 20.0 |
| pH | 3.7 | 3.6 | 3.6 |
| Viscosity (cps) *3 | 25 | 20 | 40 |
| Average particle size *4 | 72 | 74 | 74 |

| | (c-5) | (c-6) | (c-7) | (c-8) |
|---|---|---|---|---|
| Initial amount of deionized water | 700 | 700 | 700 | 700 |
| Ratemuru K-180 #1 | 16 | 16 | 16 | 16 |
| Type of polymerization initiator *2 | VA-086 | VA-086 | VA-086 | VA-080 |
| Monomer component (I) | | | | |
| Styrene | 32 | 32 | 32 | 32 |
| n-Butyl acrylate | 32 | 32 | 32 | 32 |
| 1,6-hexanediol diacrylate | 30 | 30 | 30 | 30 |
| 2-Hydroxyethyl acrylate | 4 | 4 | 4 | 4 |
| KBM-503 | 2 | 2 | 2 | 2 |
| Monomer component (II) | | | | |
| Styrene | 36 | 36 | 36 | 36 |
| n-Butyl acrylate | 36 | 36 | 36 | 36 |
| 2-Hydroxyethyl acrylate | 4 | 4 | 4 | 4 |

TABLE 2-continued

| | | | | |
|---|---|---|---|---|
| N,N'-dimethylaminoethyl methacrylate | 4 | | 4 | 4 |
| N,N'-dimethylaminopropyl methacrylate | | 4 | | |
| Isocyanate (e-1) solution | 22 | | | 22 |
| Isocyanate (e-2) solution | | 22 | 22 | |
| Component (I)/Component (II) ratio | 50/50 | 50/50 | 50/50 | 50/50 |
| Properties of finely divided gelled polymer dispersion | | | | |
| Solids content (%) | 20.0 | 19.9 | 19.9 | 19.9 |
| pH | 5.4 | 5.9 | 5.1 | 5.3 |
| Viscosity (cps) *3 | 50 | 40 | 30 | 48 |
| Average particle size *4 | 80 | 82 | 85 | 81 |

*1 Tradename for quaternary ammonium salt-type allyl group-containing cationic reactive emulsifying agent made by Kao Corporation
*2 VA-086: 2,2'-azobis[2-methyl-N-(2-hydroxy ethyl)]-propionamide VA-080: 2,2'-azobis[2-methyl-N-(1,1'-bis(hydroxymethyl)-2-hydroxyethyl)]-propionamide
*3 BM-type rotary viscometer NO. 2 spindle
*4 measured by Nanosizer N-4 of Coulter Co.

5. Production of Pigment Paste

Ten percent formic acid (4.4 parts) was added to 12.5 parts of a resin (A) and 15 parts of deionized was then added with stirring. To the mixture were further added 10 parts of titanium white, 10 parts of clay, 1 part of carbon and 2 parts of basic lead silicate. The resulting mixture was dispersed in a ball mill for 24 hours, and 11 parts of deionized water was added thereto to obtain a paste having a solids content of 50%.

By the way, the same type as the resin (A) used to prepare the resin composition for cationically electrodepositable paint was used as said resin (A).

II. EXAMPLES AND COMPARATIVE EXAMPLES

Using the components (A), (B) and (C) and the pigment paste obtained in Production Examples, a cationically electrodepositable paint was prepared. First, the components (A) and (B) were mixed, then the component (C) and the pigment paste were blended, and the deionized water was added to obtain a cationic electrodeposition paint bath having a solids content of about 20%. The composition of the paint and the properties of the coated film are shown in Table 3.

In Table 3:
(i) The amounts of the components (A), (B) and (C), the pigment paste and lead octanoate are shown as solids contents.
(ii) The pH of the electrodeposition paint bath was adjusted with a 10% formic acid aqueous solution.
(iii) The solids content of the electrodeposition paint bath was adjusted with deionized water.
(iv) Comparative Examples are as follows.

COMPARATIVE EXAMPLE 1

A composition was obtained by removing the component (C) from the composition in Example 1.

COMPARATIVE EXAMPLE 2

Example 2 was repeated except that 30 parts of the epoxy resin (B-2) was replaced with 33 parts of a curing agent obtained by completely blocking diphenylmethane diisocyanate with 2-ethylhexyl monoether compound of ethylene glycol and 3 parts, per 100 parts in total of the components (A) and (B), of dioctyltin oxide was used as a catalyst.

COMPARATIVE EXAMPLE 3

Comparative Example 2 was repeated except that the component (C) was not used.

IV. TESTS OF PROPERTIES

Each of the cationically electrodepositable paint baths obtained in Examples and Comparative Examples was kept at 30° C., a zinc phostate-treated steel plate was dipped therein, and cationic electrodeposition was performed at 200 to 300 V for 3 minutes. The resulting plate was drawn from the bath, rinsed with water, dried with air and heated at 160° C. for 30 minutes to crosslink and cure a coated film. A thickness (flat portion) of the cured coated film was 15 to 23 microns.

Using the thus coated plates, tests of properties were conducted. The results are shown in Table 3.

Methods for measuring the properties are as follows.

Weight Loss on Heating

The weight of the treated plate is made $W_0$. After the sample is electrodeposited on the treated plate at 30° C. for 3 minutes, the plate is dried under reduced pressure in a vacuum dryer at 80° C. for 1 hour. The weight of the dried plate is made $W_1$, and the weight after baking in the dryer at 180° C. for 30 minutes is made $W_2$. The weight loss on heating W is calculated by the following equation.

$$W = \frac{W_2 - W_0}{W_1 - W_0} \times 100(\%)$$

Melt Viscosity of a Coated Film

Melt viscosity of an electrodeposition coated film in heating at 160° C. is evaluated from heat flowing appearance of a scratch in contrast with a method of measuring with a ball rotation viscometer (according to JIS-Z-0237). The value shows the lowest viscosity (cps).

Smoothness of a Coated Surface

Finish of the heat cured, electrodeposition coated surface is evaluated with an unaided eye.
○: good
⊚: nearly good
△: slightly poor

Impact Strength

Impact strength is measured under an atmosphere of 20° C. according to JIS K5400-1979 6, 13, 3B. The maximum height (cm) at which a coated film is not damaged under a condition that a radius of an end of an impact center is ½". 50 cm is made the highest value.

Edge Coverability

A steel plate with an edge angle of 45° is electrodeposition coated under a condition that a thickness of a coated film in a flat portion reaches 20 micrometers, and cured under given baking conditions. The cured coated film is set in a salt spray device such that the edge of the test plate becomes perpendicular, and corrosion resistance of the edge after 168 hours is evaluated by a salt spray test according to JIS-A-2371.
⊚: Rust does not occur at all.

○: Rust slightly occurs.
Δ: Rust heavily occurs.
X: Rust occurs throughout the edge.

Corrosion Resistance

The electrodeposition coated film is crosscut with a knife to reach a substrate, and then a salt spray test is conducted for 1,000 hours according to JIS Z2871. Rust and a width of blister from a knife cut are measured.
○: less than 1 mm
Δ: 1 to less than 3 mm
X: 3 mm or more

Weatherability

An electrodeposition coated test plate is subjected to a sunshine weatherometer, and weatherability is evaluated by gloss retention after 1,000 hours according to the following equation.

$$\text{Gloss retention} = \frac{60° \text{ gloss value after test}^*}{\text{initial } 60° \text{ gloss value}} \times 100$$

*60° gloss is measured by a glossmeter (GM26D: a tradename for a machine of Murakami Shikisai Kenkyusho).

Gloss retention:
○: 80% or higher
Δ: 50 to 89%
X: 49% or lower

TABLE 3

|  |  | Examples |  |  |  |
|---|---|---|---|---|---|
|  |  | 1 | 2 | 3 | 4 |
| Composition |  |  |  |  |  |
| (A) component | Type | (A-1) | (A-2) | (A-3) | (A-1) |
|  | Amount | 91 | 91 | 91 | 91 |
| (B) component | Type | (B-1) | (B-2) | (B-3) | (B-4) |
|  | Amount | 30 | 30 | 30 | 35 |
| (C) component | Type | (C-1) | (C-2) | (C-3) | (C-4) |
|  | Amount | 12 | 12 | 12 | 15 |
| Pigment paste |  | 30 | 30 | 30 | 30 |
| Lead octanoate |  | 3 | 3 | 3 | 3 |
| pH |  | 5.6 | 5.6 | 5.6 | 5.8 |
| Solids content (%) |  | 20 | 20 | 20 | 20 |
| Properties |  |  |  |  |  |
| Weight loss on heating (%) |  | 3.4 | 3.3 | 3.3 | 3.5 |
| Melt viscosity of a coated film |  | $10^6$ | $10^6$ | $10^6$ | $10^6$ |
| Smoothness of a coated surface |  | ⊚ | ⊚ | ⊚ | ⊚ |
| Impact strength |  | 50 | 50 | 50 | 50 |
| Edge coverability |  | ⊚ | ○ | ○ | ○ |
| Corrosion resistance |  | ○ | ○ | ○ | ○ |
| Weatherability |  | ○ | ○ | ○ | ○ |
|  |  | Examples |  |  |  |
|  |  | 5 | 6 | 7 | 8 |
| Composition |  |  |  |  |  |
| (A) component | Type | (A-2) | (A-3) | (A-1) | (A-2) |
|  | Amount | 91 | 91 | 91 | 91 |
| (B) component | Type | (B-5) | (B-6) | (B-7) | (B-8) |
|  | Amount | 35 | 35 | 40 | 40 |
| (C) component | Type | (C-5) | (C-6) | (C-7) | (C-8) |
|  | Amount | 15 | 15 | 18 | 18 |
| Pigment paste |  | 30 | 30 | 30 | 30 |
| Lead octanoate |  | 3 | 3 | 3 | 3 |
| pH |  | 5.8 | 5.8 | 6.0 | 6.0 |
| Solids content (%) |  | 20 | 20 | 20 | 20 |
| Properties |  |  |  |  |  |
| Weight loss on heating (%) |  | 3.4 | 3.6 | 3.4 | 3.3 |
| Melt viscosity of a coated film |  | $10^6$ | $10^6$ | $10^6$ | $10^6$ |
| Smoothness of a coated surface |  | ⊚ | ⊚ | ⊚ | ⊚ |
| Impact strength |  | 50 | 50 | 50 | 50 |
| Edge coverability |  | ⊚ | ○ | ○ | ○ |
| Corrosion resistance |  | ○ | ○ | ○ | ○ |
| Weatherability |  | ○ | ○ | ○ | ○ |
|  |  | Comparative Examples |  |  |  |
|  |  | 9 | 1 | 2 | 3 |
| Composition |  |  |  |  |  |
| (A) component | Type | (A-1) | (A-1) | (A-2) | (A-2) |
|  | Amount | 91 | 91 | 91 | 91 |
| (B) component | Type | (B-9) | (B-1) | (B-10) | (B-10) |
|  | Amount | 40 | 30 | 30 | 30 |
| (C) component | Type | (C-1) | — | — | (C-2) |
|  | Amount | 18 | — | — | 12 |
| Pigment paste |  | 30 | 30 | 30 | 30 |
| Lead octanoate |  | 3 | 3 | 3 | 3 |
| pH |  | 6.0 | 5.6 | 5.6 | 5.6 |
| Solids content (%) |  | 20 | 20 | 20 | 20 |
| Properties |  |  |  |  |  |
| Weight loss on heating (%) |  | 3.4 | 3.4 | 19.6 | 19.1 |
| Melt viscosity of a coated film |  | $10^6$ | $10^3$ | $10^4$ | $10^{1.5}$ |
| Smoothness of a coated surface |  | ⊚ | ○ | ⊚ | ○ |
| Impact strength |  | 50 | 50 | 50 | 50 |
| Edge coverability |  | ○ | Δ | x | Δ |
| Corrosion resistance |  | ○ | ○ | ○ | ○ |
| Weatherability |  | ○ | ○ | x | x |

What we claim is:

1. A resin composition for cationically electrodepositable paint comprising, as principal components, (A) a resin containing a hydroxyl group and a cationic group, (B) an epoxy resin containing, per molecule, on the average at least 2 epoxy group-containing functional groups with an epoxy group bound to an alicyclic skeleton and/or a bridged alicyclic skeleton, and (C) a finely divided gelled polymer, said finely divided gelled polymer (C) being obtained by, in the first step, emulsion polymerizing a monomer component (I) composed of
   (a) a polymerizable unsaturated vinylsilane monomer containing a vinylic double bond and a hydrolyzable alkoxysilane or acetoxysilane group,
   (b) a polymerizable monomer containing at least two radically polymerizable unsaturated groups in a molecule,
   (c) a polymerizable unsaturated monomer containing a vinylic double bond and a hydroxyl group, and
   (d) other polymerizable unsaturated monomer in the presence of a cationic reactive emulsifying agent containing an allyl group in a molecule; and in the second step, emulsion polymerizing a monomer component (II) composed of
   (e) a blocked monoisocyanate or polyisocyanate in which at least one isocyanate group in a molecule is blocked with a radically polymerizable monohydroxy compound,
   (f) a polymerizable unsaturated monomer containing a vinylic double bond and a hydroxyl group, and
   (g) other polymerizable unsaturated monomer in the presence of the aqueous finely divided gelled polymer obtained in the first step, said polymer having a core-shell structure in which the polymerized product of the monomer component (I) is a core and the polymerized product of the monomer component (II) is a shell.

2. The resin composition of claim 1 wherein said resin (A) contains a primary hydroxyl group and a cationic group.

3. The resin composition of claim 1 wherein said resin (A) is a reaction product obtained by reacting a polyepoxide compound obtained from a polyphenol compound and epichlorohydrin with a cationizing agent.

4. The resin composition of claim 3 wherein said polyepoxide compound is polyglycidylether of the polyphenol compound having a number average molecular weight of about 800 to about 2,000 and an epoxy equivalent of 190 to 2,000.

5. The resin composition of claim 1 wherein said resin (A) has a hydroxyl equivalent within the range of 20 to 5,000.

6. The resin composition of claim 2 wherein said resin (A) has a primary hydroxyl equivalent within the range of 200 to 1,000.

7. The resin composition of claim 1 wherein said resin (A) has an amine value within the range of 3 to 200 calculated as KOH (mg/g solids).

8. The resin composition of claim 1 wherein said epoxy resin (B) has at least 3 epoxy functional groups on average per molecule.

9. The resin composition of claim 1 wherein said epoxy functional group of said epoxy resin (B) has a structure represented by either of the following general formulae (I) to (IV)

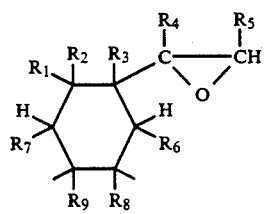
(I)

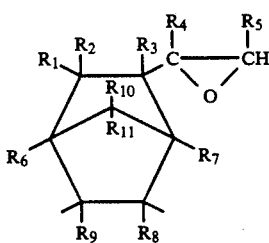
(II)

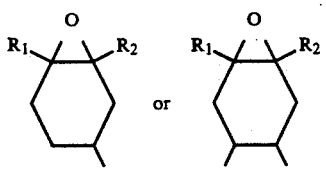
(III)

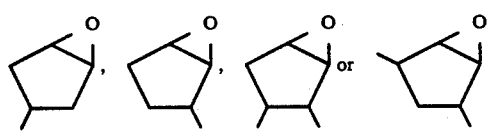
(IV)

wherein
$R_1$, $R_2$, $R_3$, $R_5$, $R_6$, $R_7$, $R_{10}$ and $R_{11}$ represent H, $CH_3$ or $C_2H_5$, respectively, and $R_4$, $R_8$ and $R_9$ represent H or $CH_3$, respectively.

10. The resin composition of claim 9 wherein said epoxy functional group is represented by the general formula (I) or (II).

11. The resin composition of claim 9 wherein said epoxy functional group is represented by the general formula (III) or (IV).

12. The resin composition of claim 9 wherein said epoxy resin (B) is an epoxy resin having at least one epoxy functional group represented by the general formula (I) or (II) and at least one epoxy functional group represented by the general formula (III) or (IV) within one and the same molecule or in different molecules.

13. The resin composition of claim 9 wherein said epoxy resin (B) has an epoxy functional group represented by the following formula (V)

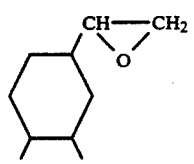
(V)

14. The resin composition of claim 9 wherein said epoxy resin (B) has an epoxy functional group represented by the following formula (VI)

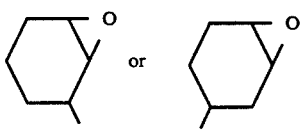
(IV)

15. The resin composition of claim 1 wherein said epoxy resin (B) has an epoxy equivalent within the range of 100 to 2,000.

16. The resin composition of claim 1 wherein said epoxy resin (B) has an epoxy equivalent within the range of 150 to 500.

17. The resin composition of claim 1 wherein said epoxy resin (B) has a number average molecular weight within the range of 400 to 100,000.

18. The resin composition of claim 1 wherein said epxoy resin (B) has a number average molecular weight within the range of 700 to 50,000.

19. The resin composition of claim 1 wherein the weight ratio of the solids content of said epoxy resin (B) to said resin (A) is within the range of 0.2 to 1.0.

20. The resin composition of claim 1 wherein the finely divided gelled polymer (C) is obtained by conducting either or both of the emulsion polymerizations of the monomer components (I) and (II) in the presence of a polymerization initiator selected from water-soluble azoamide compounds.

21. The resin composition of claim 1 wherein the monomer (a) is a compound represented by formula (R)₃SiQ wherein Q denotes a polymerizable unsaturated group which is a gamma-methacryloxypropyl group or a vinyl group, and R denotes an acetoxy group or an alkoxy group having 1 to 8 carbon atoms.

22. The resin composition of claim 21 wherein the monomer (a) is at least one member selected from the group consisting of vinyltrimethoxysilane, vinyltriethoxysilane, vinyltris(2-methoxyethoxy)silane, gamma-methacryloxypropyltrimethoxysilane and vinyltriacetoxysilane.

23. The resin composition of claim 1 wherein the monomer (b) is at least one member selected from the group consisting of a polymerizable unsaturated monocarboxylic acid ester of a polyhydric alcohol, a polymerizable unsaturated alcohol ester of a polybasic acid, an aromatic compound substituted with at least two vinyl groups and a blocked polyisocyanate in which at least two isocyanate groups are blocked with a radically polymerizable monohydroxy compound.

24. The resin composition of claim 1 wherein the monomer (c) is at least one member selected from the group consisting of 2-hydroxyethyl (meth)acrylate and hydroxypropyl (meth)acrylate.

25. The resin composition of claim 1 wherein the monomer (d) is at least one member selected from the group consisting of an alkyl (meth)acrylate monomer, a polymerizable unsaturated nitrile monomer and a vinyl aromatic monomer.

26. The resin composition of claim 1 wherein the monomer (e) is a blocked monoisocyanate in which the monoisocyanate is blocked with a polymerizable monohydroxy compound.

27. The resin composition of claim 1 wherein the monomer (e) is a blocked polyisocyanate in which at least one isocyanate group of the polyisocyanate is blocked with a polymerizable monohydroxy compound.

28. The resin composition of claim 1 wherein the monomer (f) is at least one member selected from the group consisting of 2-hydroxyethyl (meth)acrylate and hydroxypropyl (meth)acrylate.

29. The resin composition of claim 1 wherein the monomer (g) is at least one member selected from the group consisting of an alkyl (meth)acrylate monomer, a polymerizable unsaturated nitrile monomer and a polymerizable vinyl aromatic monomer.

30. The resin composition of claim 1 wherein the monomer component (I) comprises

| | |
|---|---|
| the monomer (a) | 0.5 to 10% by weight, |
| the monomer (b) | 1 to 50% by weight, |
| the monomer (c) | 1 to 30% by weight, and |
| the monomer (d) | 10 to 97.5% by weight. |

31. The resin composition of claim 1 wherein the monomer component (II) comprises

| | |
|---|---|
| the monomer (e) | 10 to 40% by weight, |
| the monomer (f) | 1 to 30% by weight, and |
| the monomer (g) | 30 to 89% by weight. |

32. The resin composition of claim 1 wherein the monomer (g) is at least one member elected from the group consisting of
(g-1) a polymerizable unsaturated monomer containing an amino group in a molecule, and
(g-2) an alkyl (meth)acrylate monomer, a polymerizable unsaturated nitrile monomer and a vinyl aromatic monomer.

33. The resin composition of claim 32 wherein the monomer (g-1) is at least one member selected from the group consisting of compounds represented by formulas

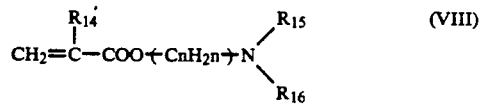

and

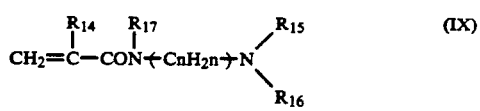

wherein $R_{14}$ denotes a hydrogen atom or a methyl group, $R_{15}$ and $R_{16}$, independently from each other, denote a hydrogen atom or a $C_1$-$C_6$ alkyl group, $R_{17}$ denotes a hydrogen atom or a lower alkyl group, and n is an integer of 2 to 8.

34. The resin composition of claim 32 in which the monomer component (II) comprises

| | |
|---|---|
| the monomer (e) | 10 to 40% by weight, |
| the monomer (f) | 1 to 30% by weight, |
| the monomer (g-1) | 1 to 10% by weight, and |
| the monomer (g-2) | 20 to 88% by weight. |

35. The resin composition of claim 1 wherein the monomer component (I)/ monomer component (II) weight ratio is within the range of 10/90 to 90/10.

36. The resin composition of claim 1 wherein the amount of the cationic reactive emulsifying agent is 0.1 to 30% by weight per 100 parts by weight of the solids content of the cationically electrodepositable finely divided gelled polymer (c).

37. The resin composition of claim 1 wherein the cationic reactive emulsifying agent is a quaternary ammonium salt-containing reactive emulsifying agent represented by formula (X)

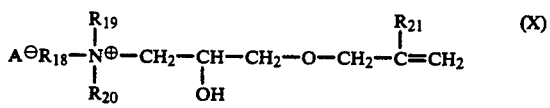

wherein $R_{18}$ denotes a hydrocarbon group with 8 to 22 carbon atoms that may optionally have a substituent, $R_{19}$ and $R_{20}$ each denote an alkyl group with 1 to 3 carbon atoms, $R_{21}$ denotes a hydrogen atom or a methyl group, and $A^{\ominus}$ denotes a monovalent anion.

38. The resin composition of claim 1 further containing at least one metal compound selected from the group consisting of a lead compound, a zirconium compound, a cobalt compound, an aluminum compound, a manganese compound, a copper compound, a zinc compound, an iron compound, a chromium compound and a nickel compound in such an amount that the metal content based on the total weight of the resin (A) and the epoxy resin (B) is not more than 10% by weight.

39. A cationically electrodepositable paint containing the resin composition of claim 1.

40. A product coated with a cationically electrodepositable paint of claim 39.

* * * * *